Feb. 21, 1939. J. W. BRYCE ET AL 2,147,626
ACCOUNTING MACHINE
Filed April 19, 1932 24 Sheets-Sheet 2
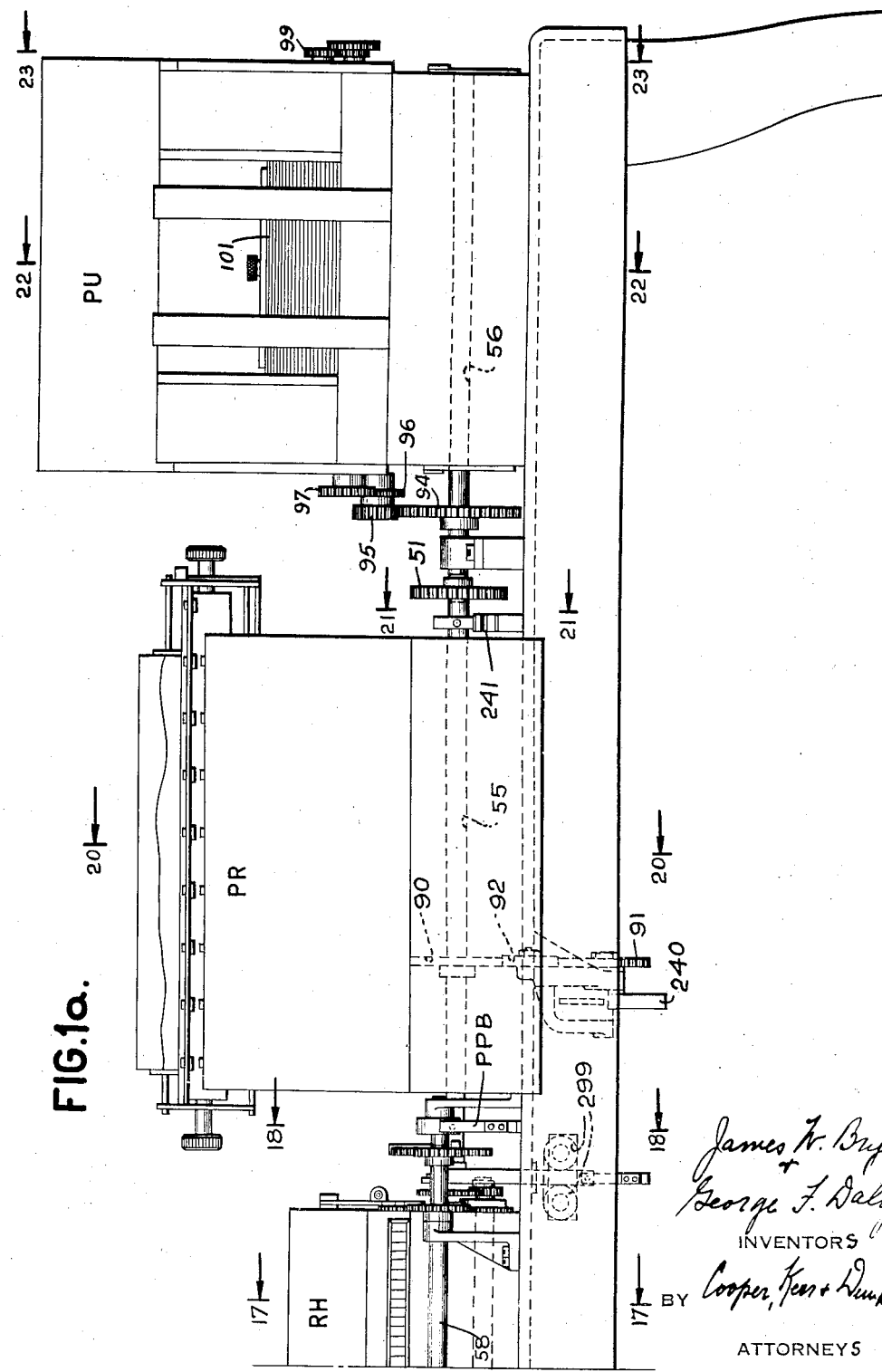

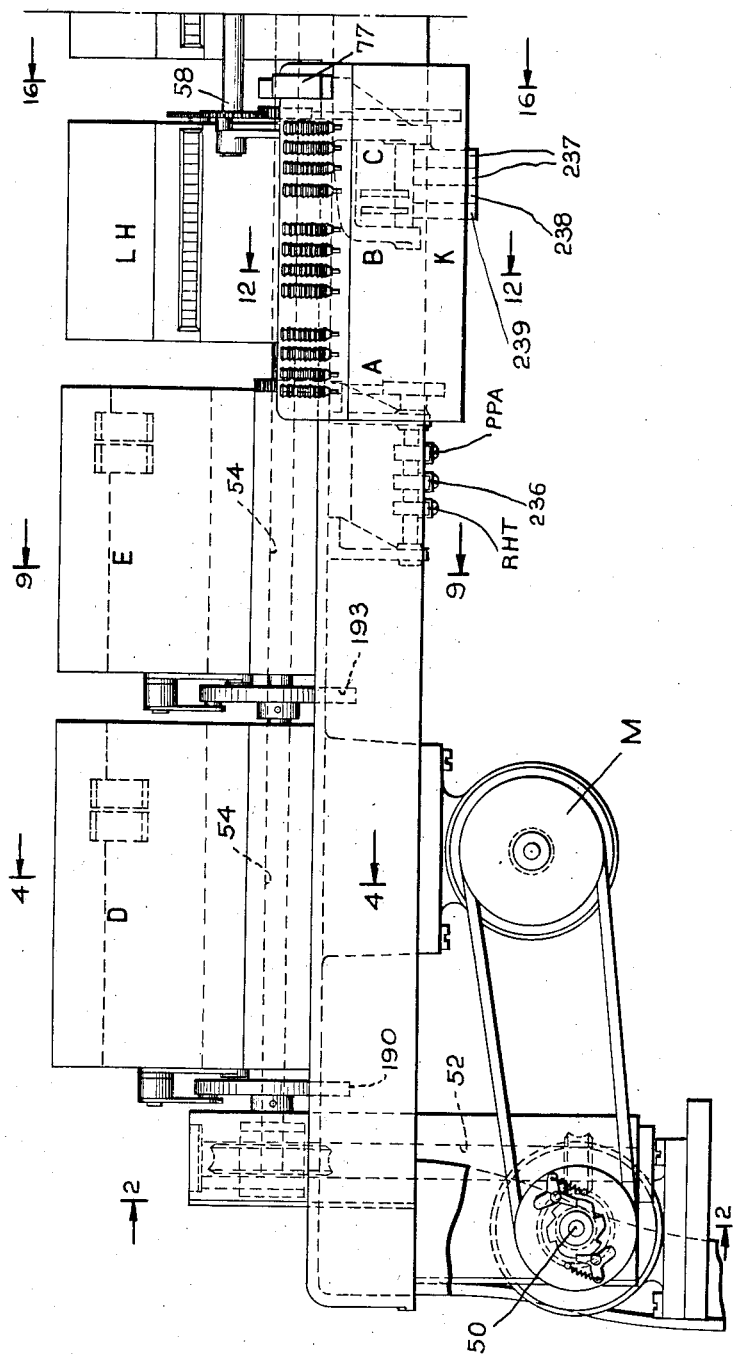

Feb. 21, 1939. J. W. BRYCE ET AL 2,147,626
ACCOUNTING MACHINE
Filed April 19, 1932 24 Sheets-Sheet 3

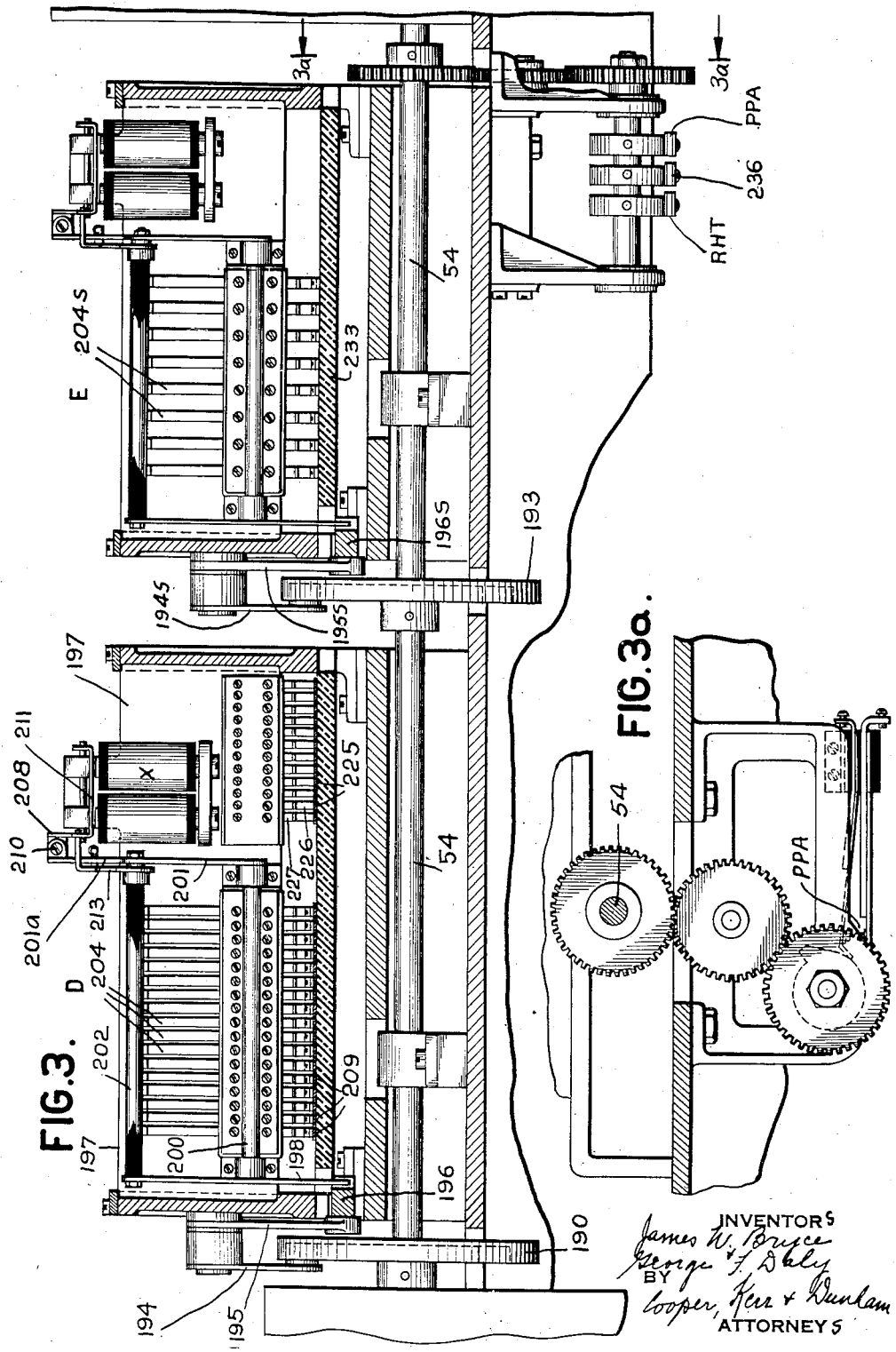

Feb. 21, 1939.   J. W. BRYCE ET AL   2,147,626
ACCOUNTING MACHINE
Filed April 19, 1932   24 Sheets—Sheet 5
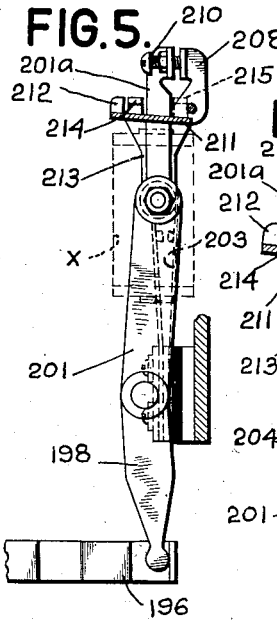
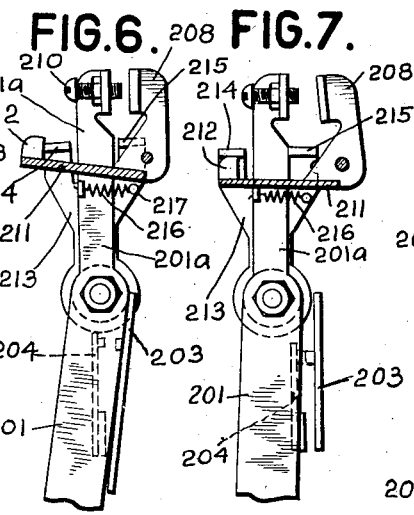
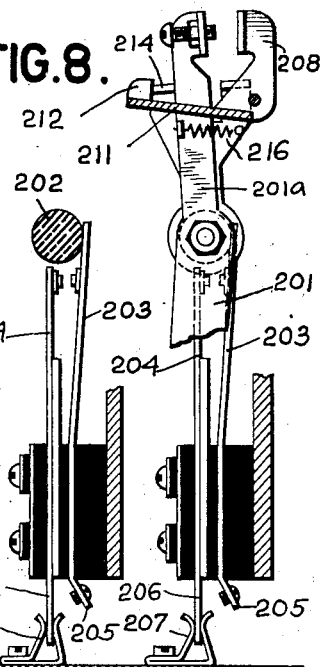
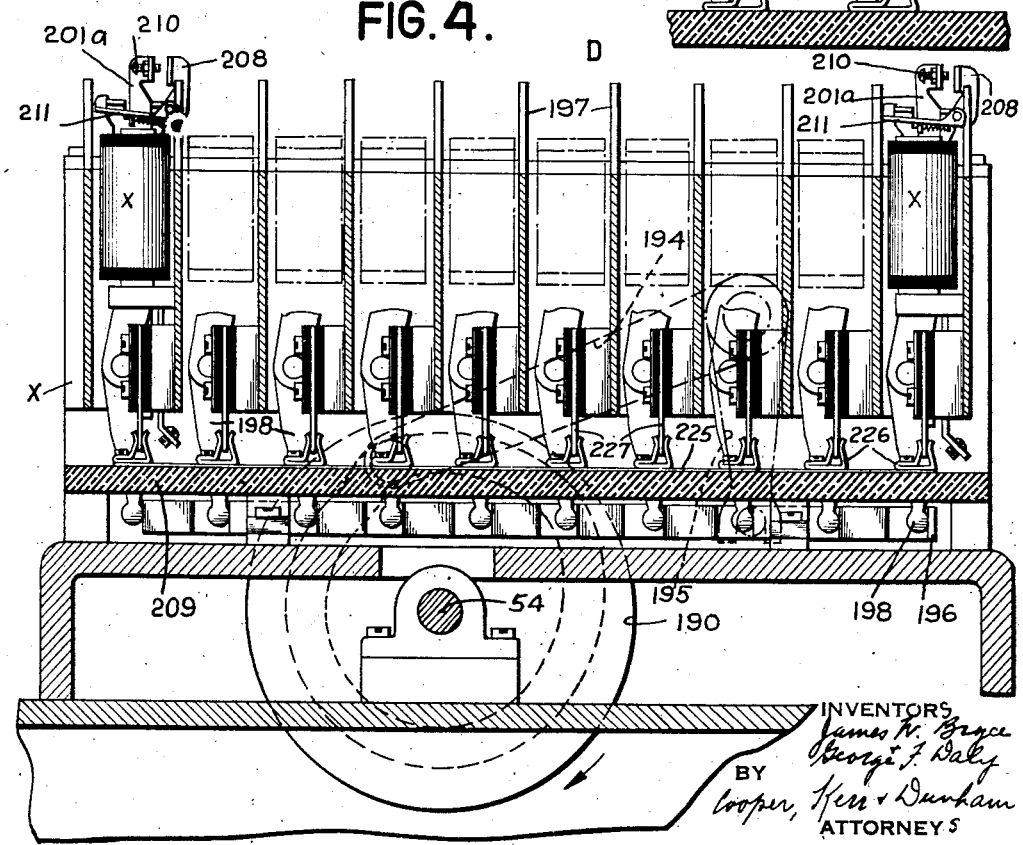

Feb. 21, 1939.　　　J. W. BRYCE ET AL　　　2,147,626
ACCOUNTING MACHINE
Filed April 19, 1932　　　24 Sheets-Sheet 6
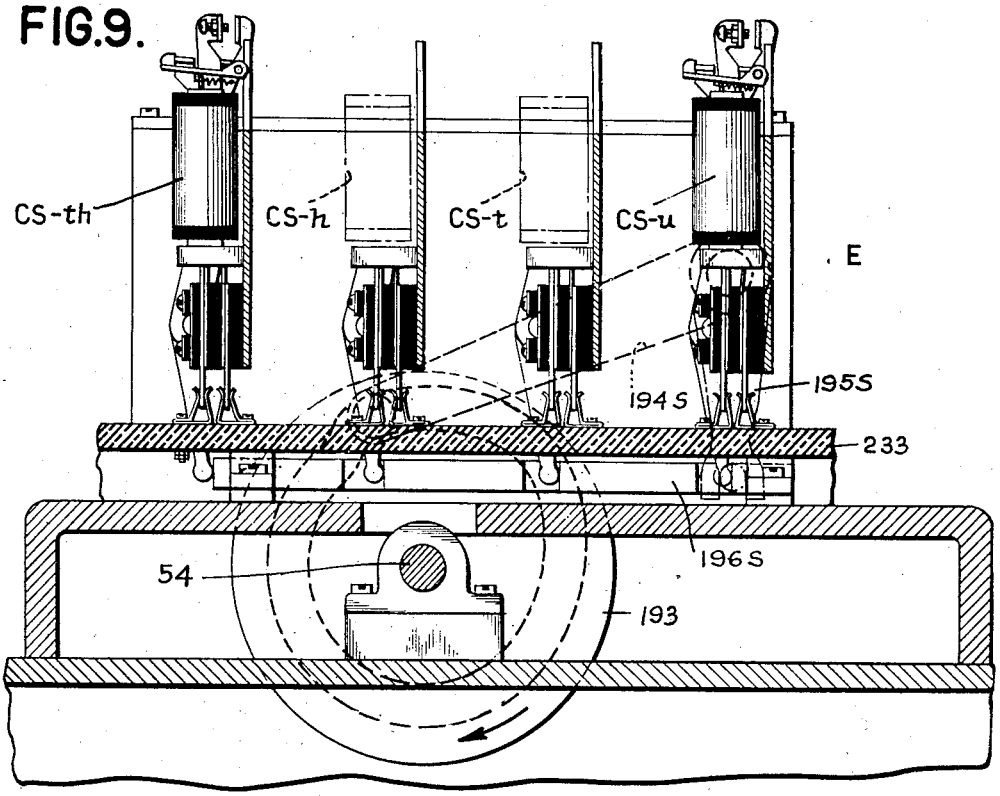
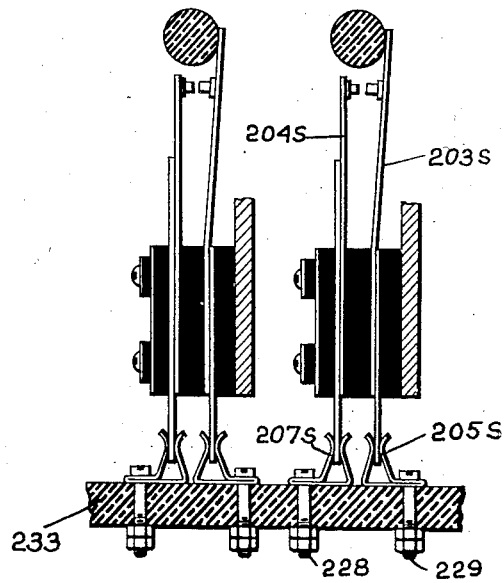

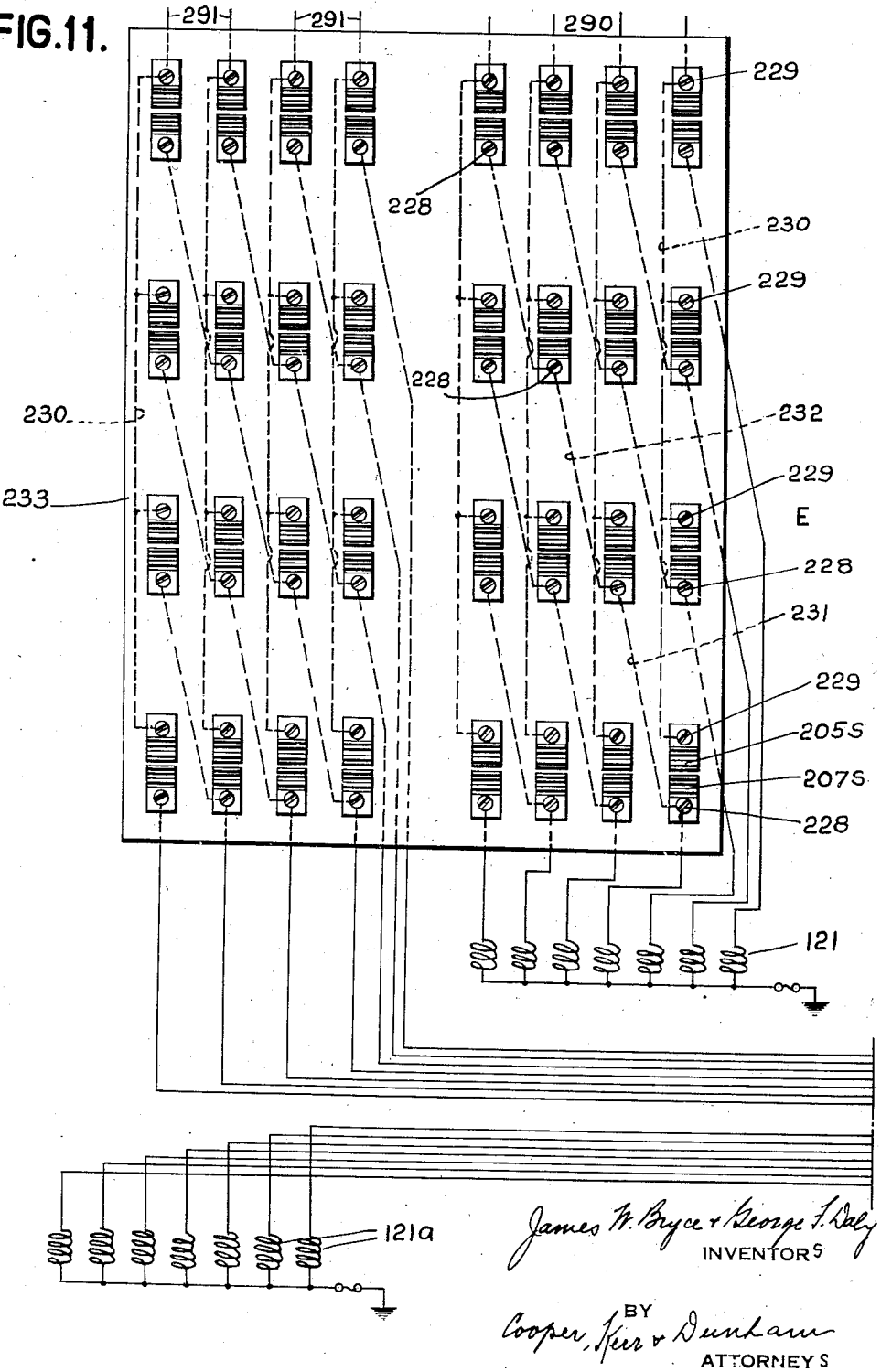

Feb. 21, 1939.   J. W. BRYCE ET AL   2,147,626
ACCOUNTING MACHINE
Filed April 19, 1932   24 Sheets-Sheet 8
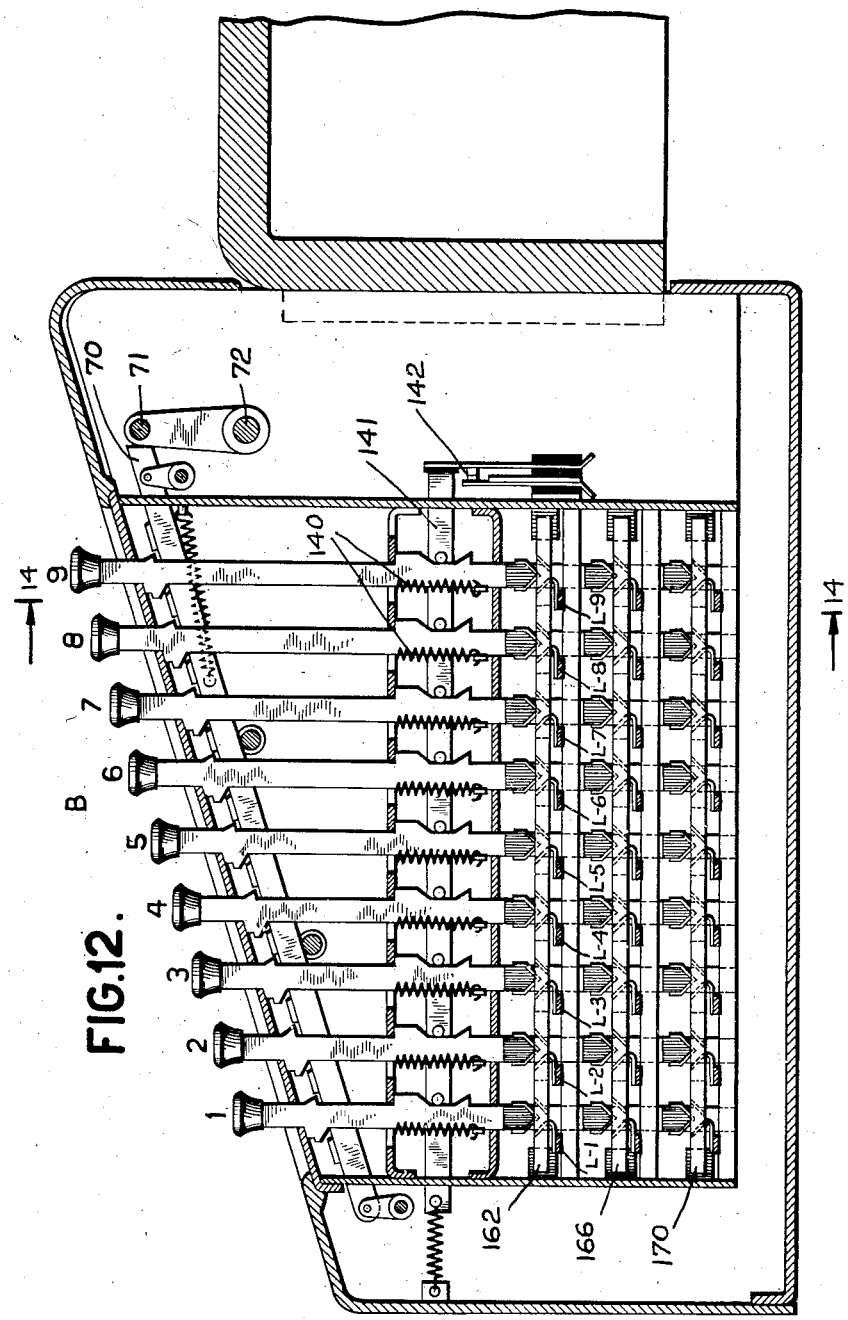

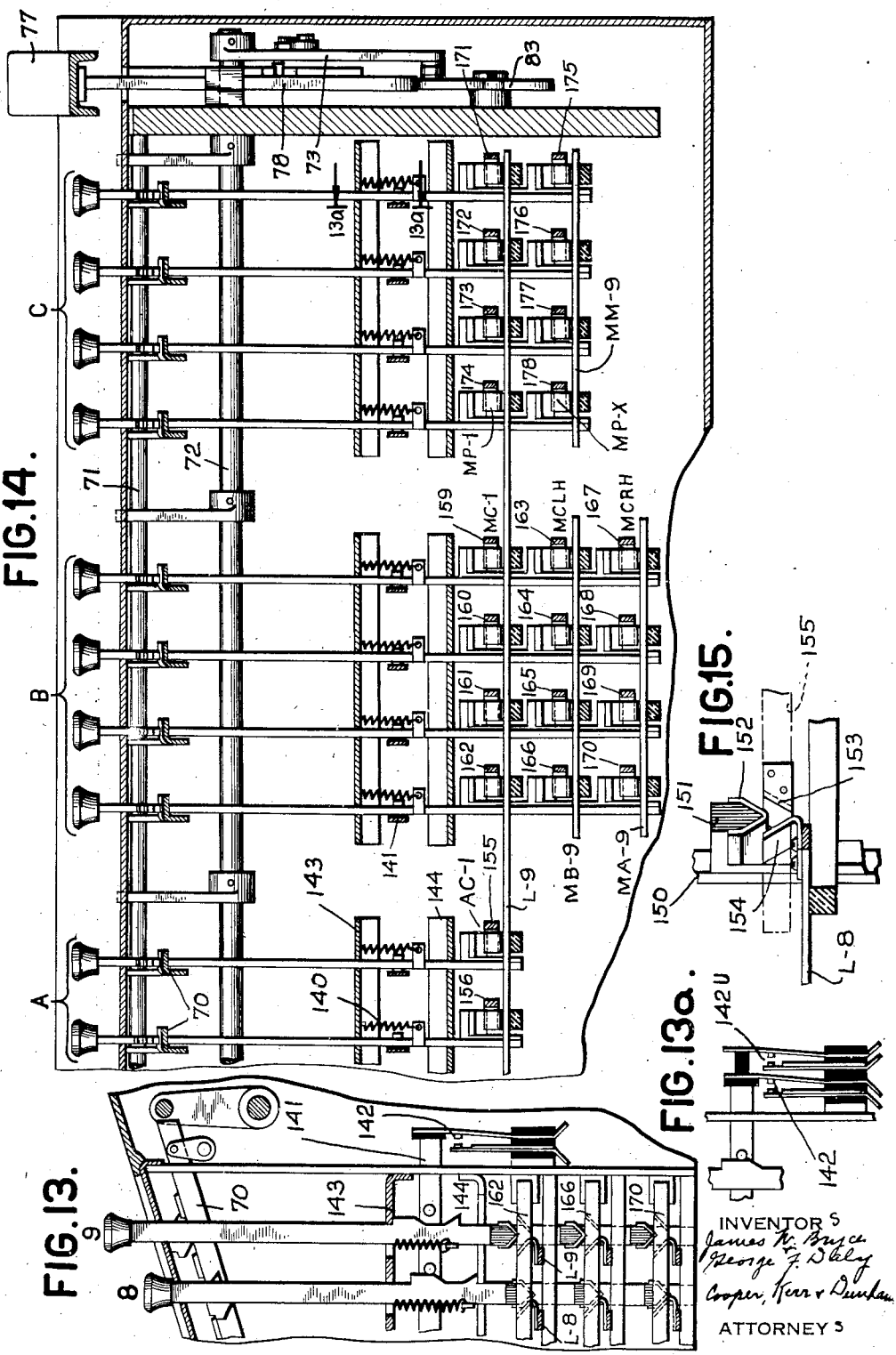

Feb. 21, 1939.  J. W. BRYCE ET AL  2,147,626
ACCOUNTING MACHINE
Filed April 19, 1932   24 Sheets-Sheet 10

James W. Bryce
George F. Daly
INVENTORS

BY Cooper, Kerr & Dunham
ATTORNEYS

Feb. 21, 1939.  J. W. BRYCE ET AL  2,147,626
ACCOUNTING MACHINE
Filed April 19, 1932   24 Sheets-Sheet 11

James W. Bryce
George F. Daly
INVENTORS

BY
Cooper, Kerr & Dunham
ATTORNEYS

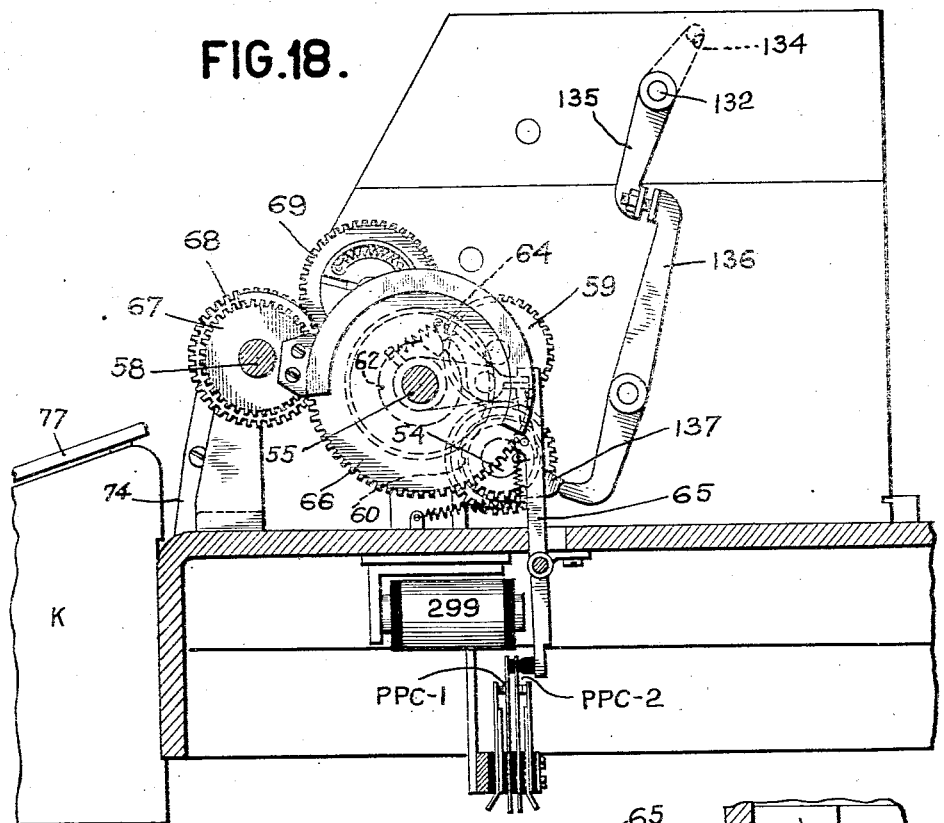
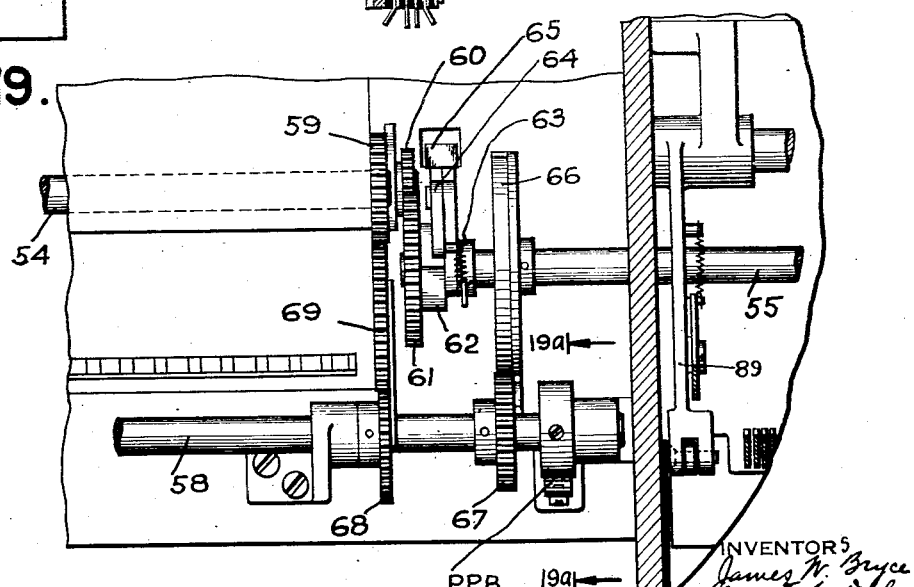

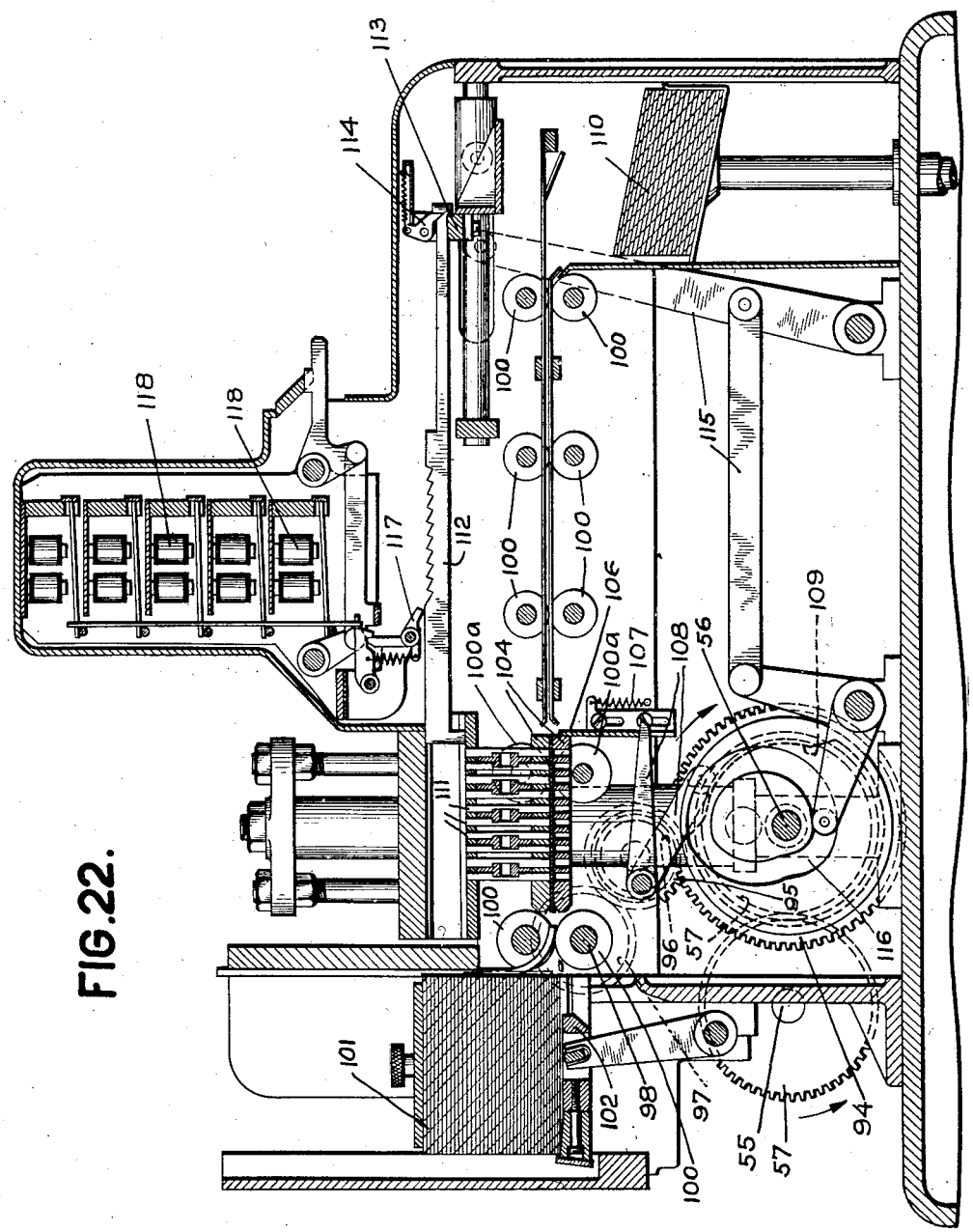

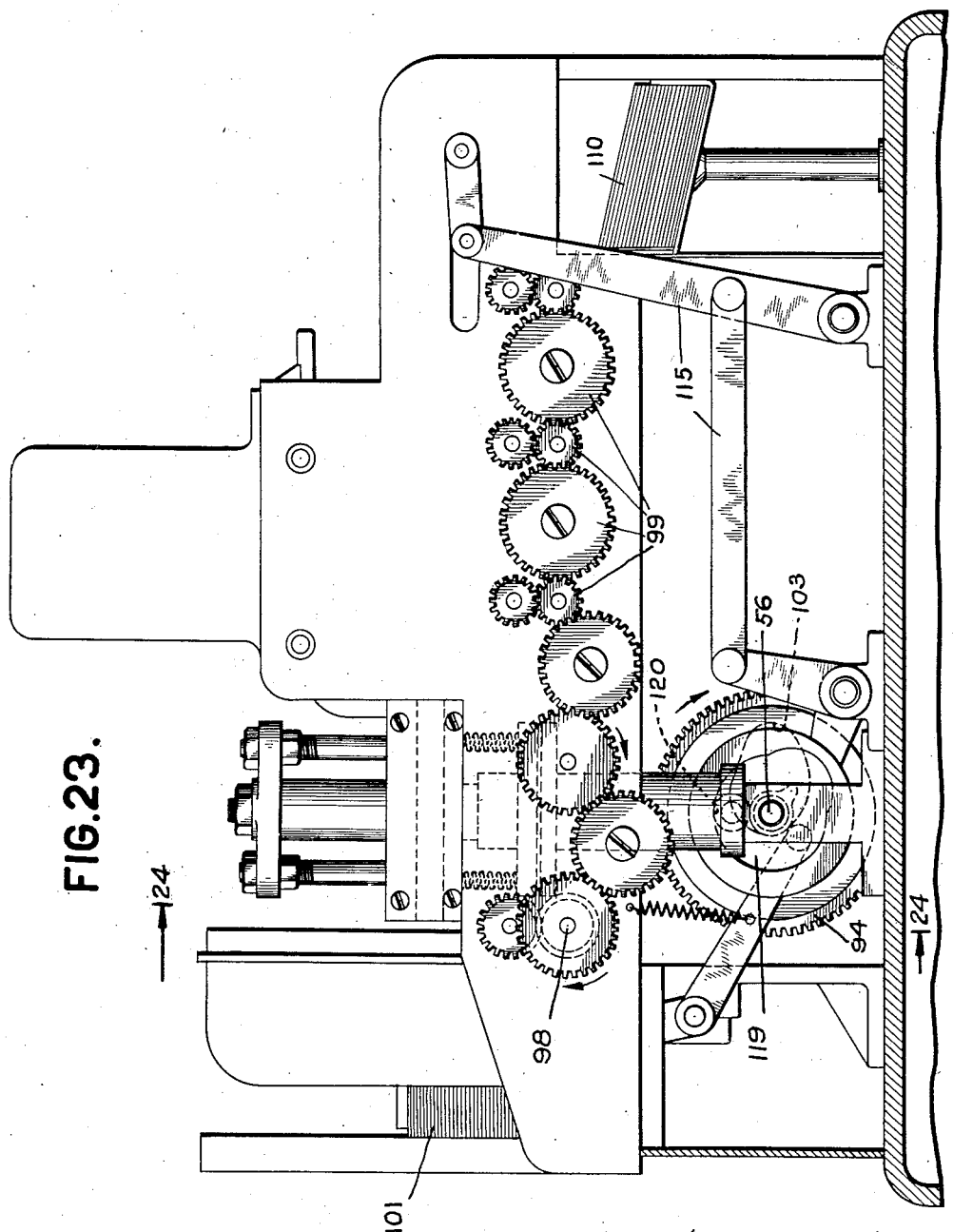

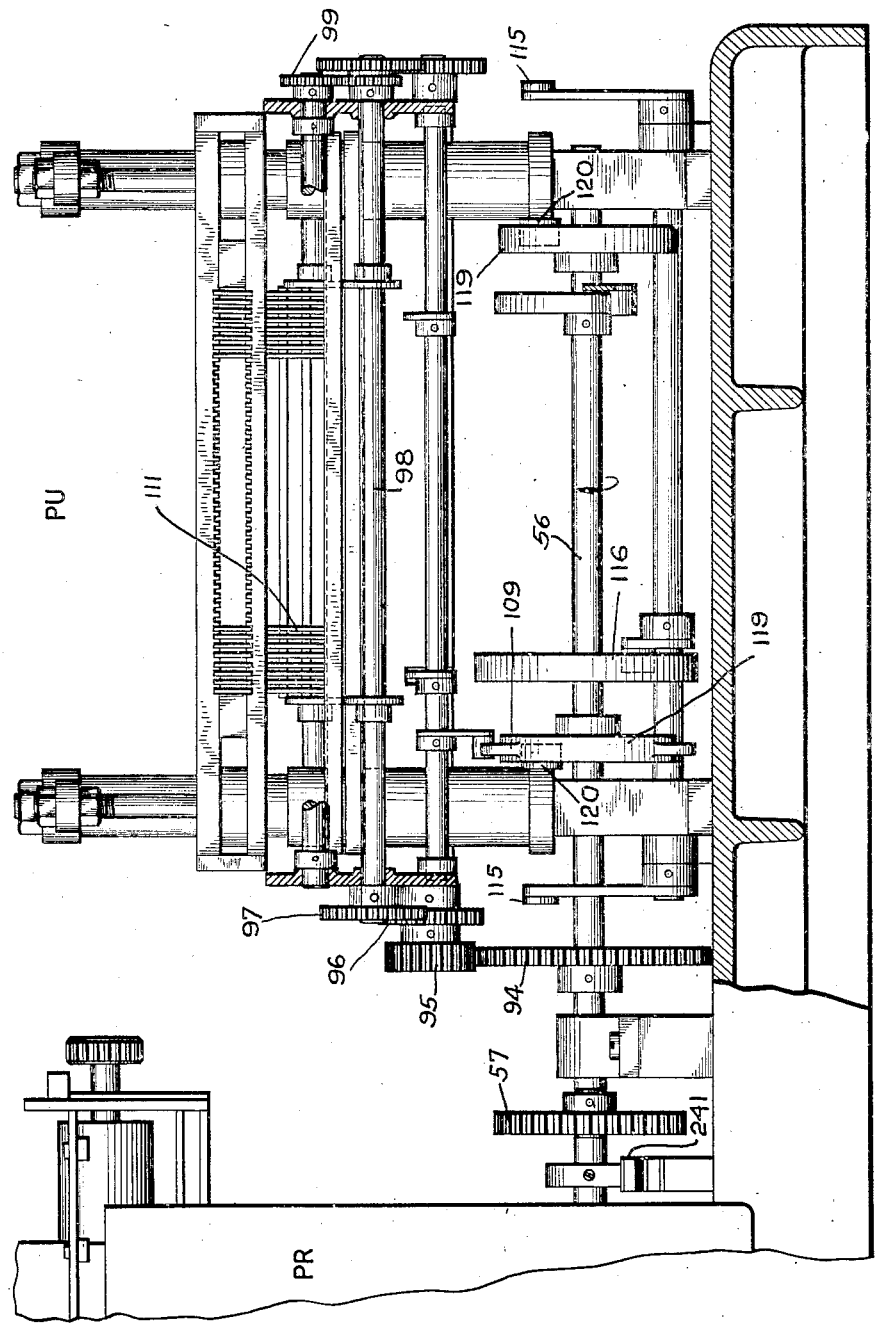

Feb. 21, 1939.   J. W. BRYCE ET AL   2,147,626
ACCOUNTING MACHINE
Filed April 19, 1932   24 Sheets-Sheet 17
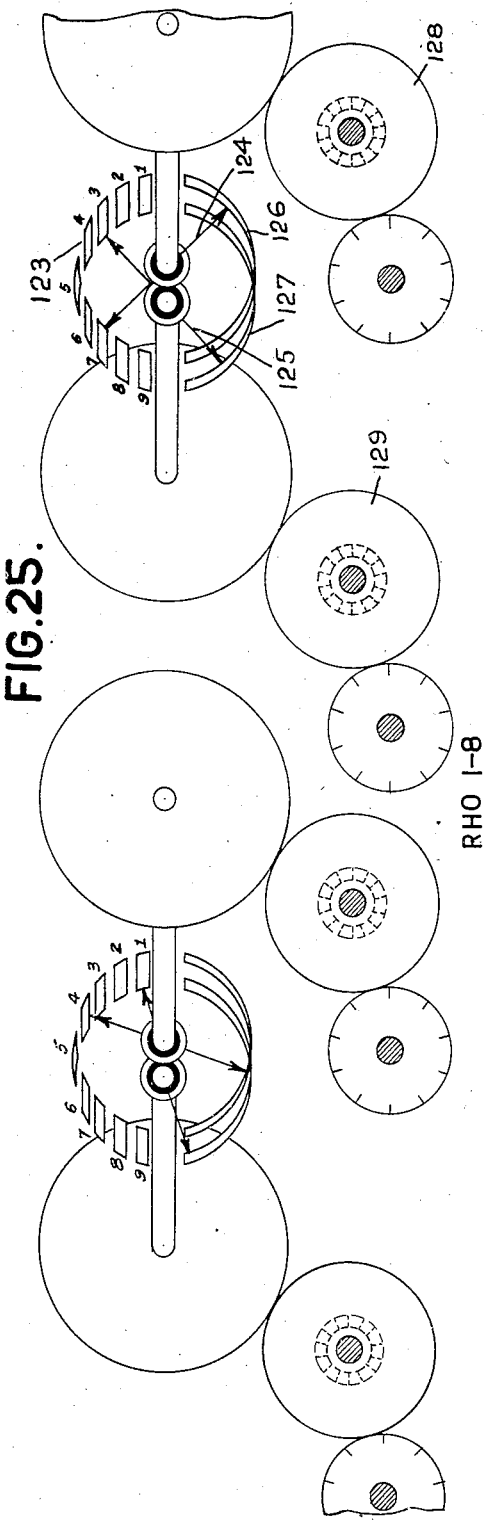
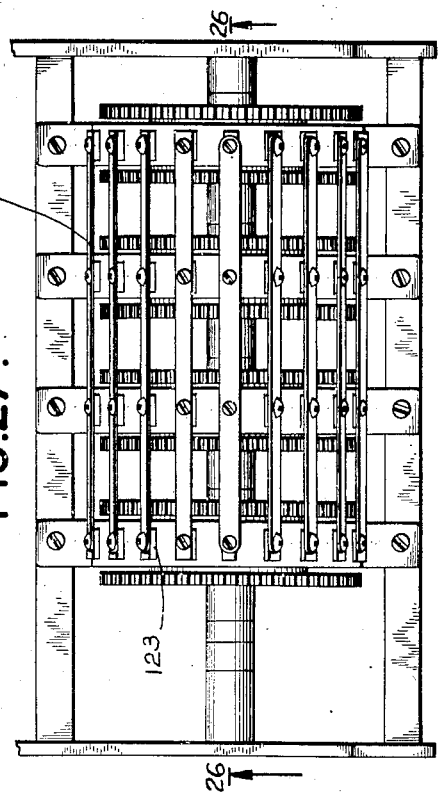
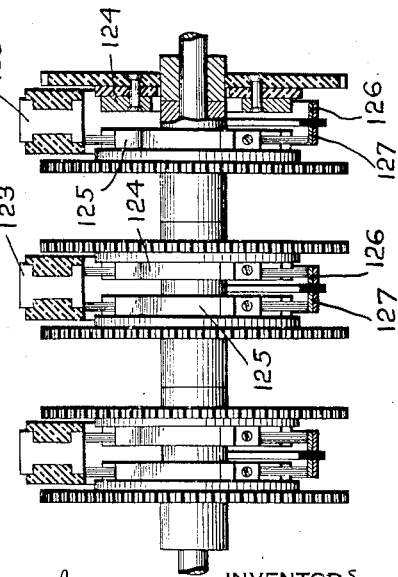
INVENTORS
James W. Bryce & George F. Daly
BY
Cooper, Kerr & Dunham
ATTORNEYS Feb. 21, 1939.   J. W. BRYCE ET AL   2,147,626
ACCOUNTING MACHINE
Filed April 19, 1932   24 Sheets-Sheet 19

| ACCOUNT № | MULTIPLICAND | MULTIPLIER | PRODUCT |
|---|---|---|---|
| 3225 | 1326 | 9007 | 11943282 |

INVENTORS
James W. Bryce & George F. Daly
BY
Cooper, Kerr & Dunham
ATTORNEYS

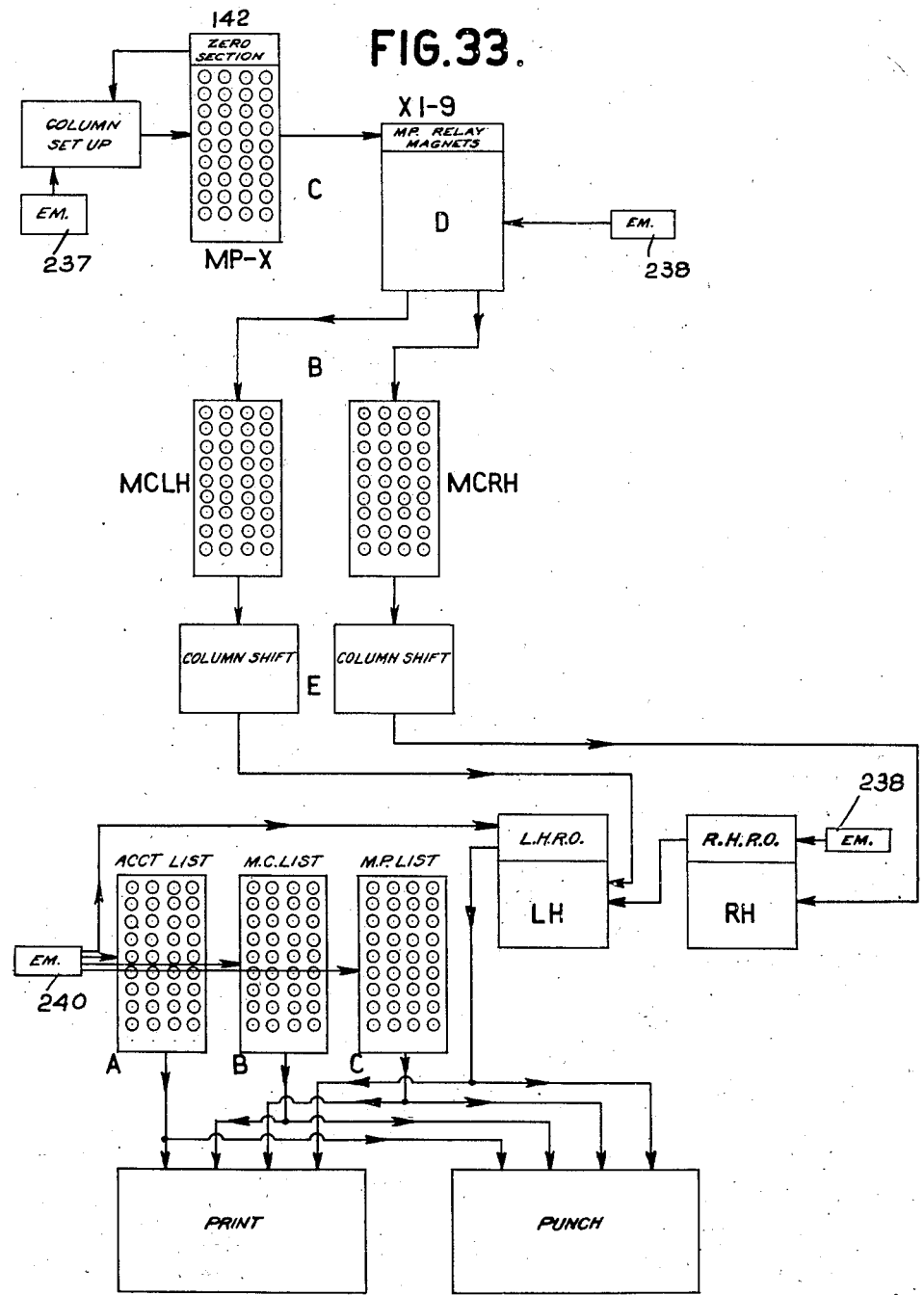

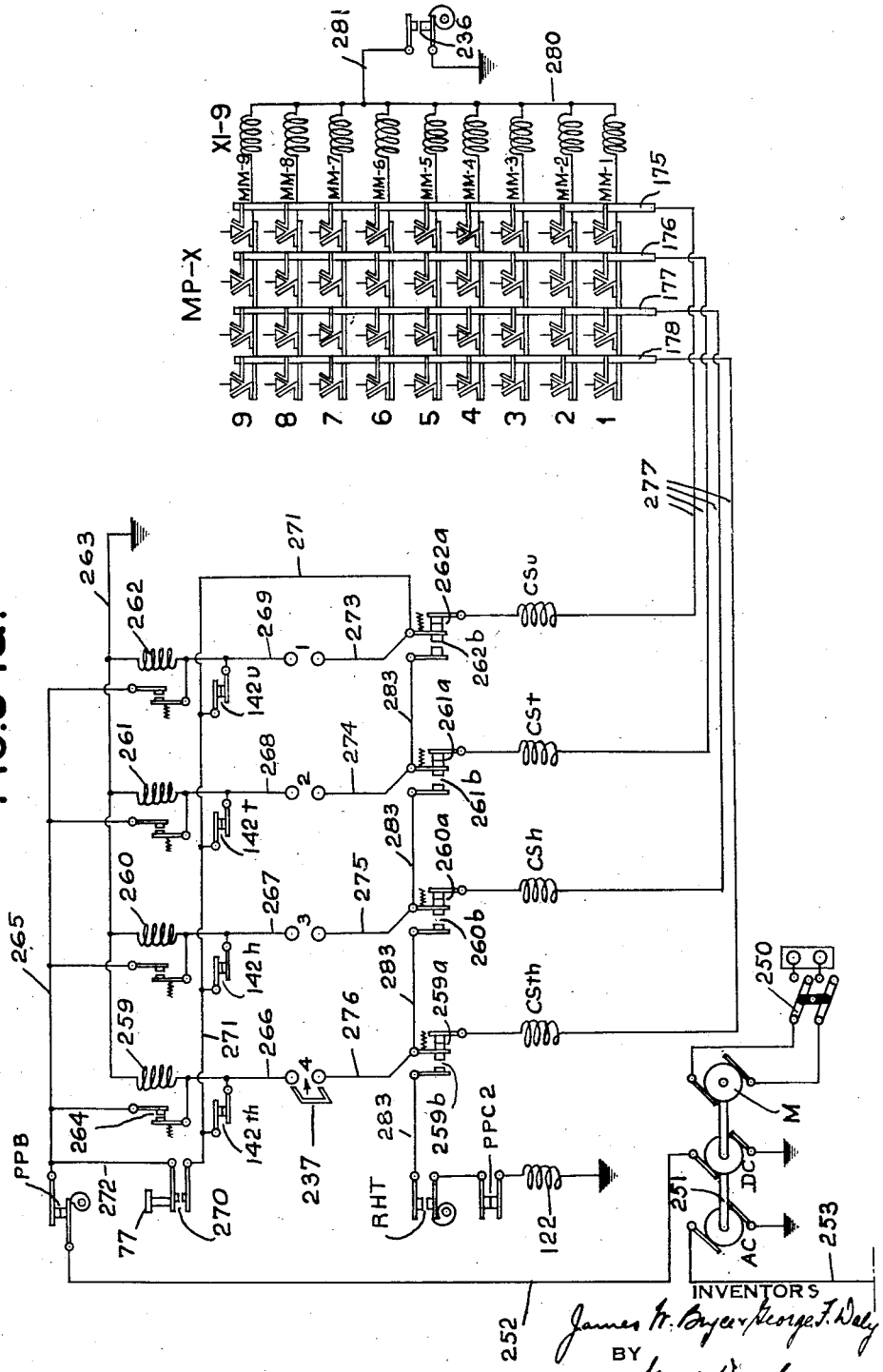

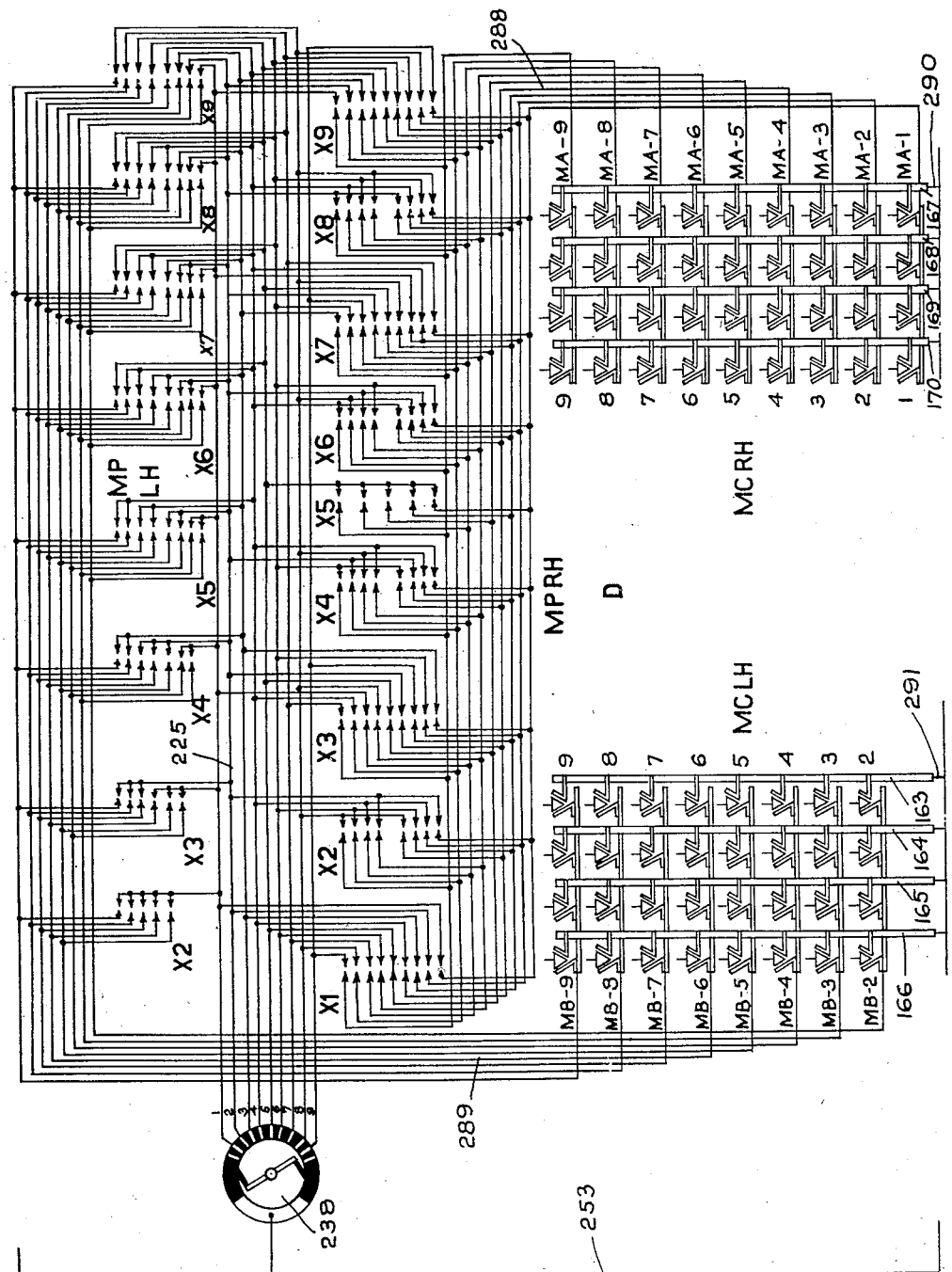

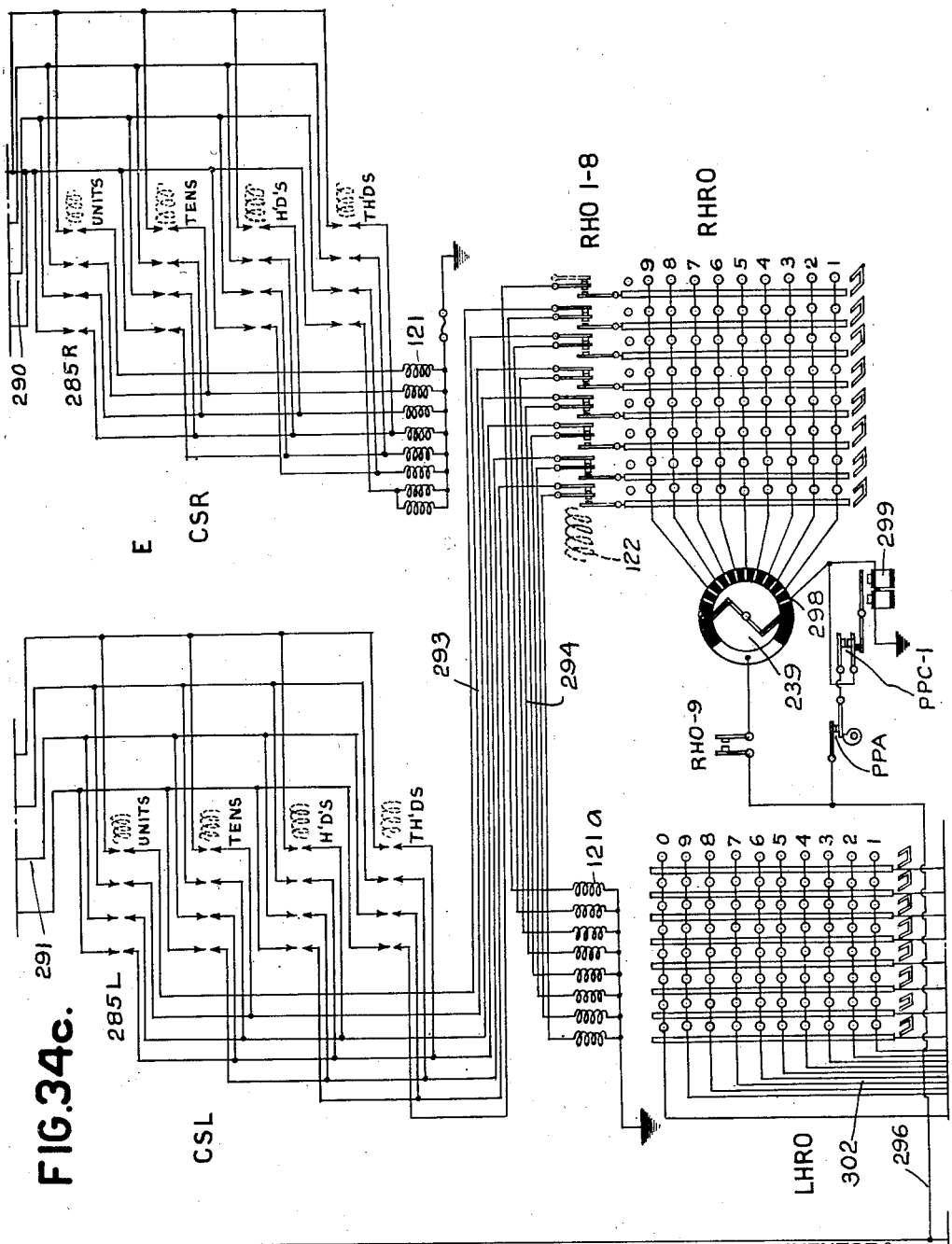

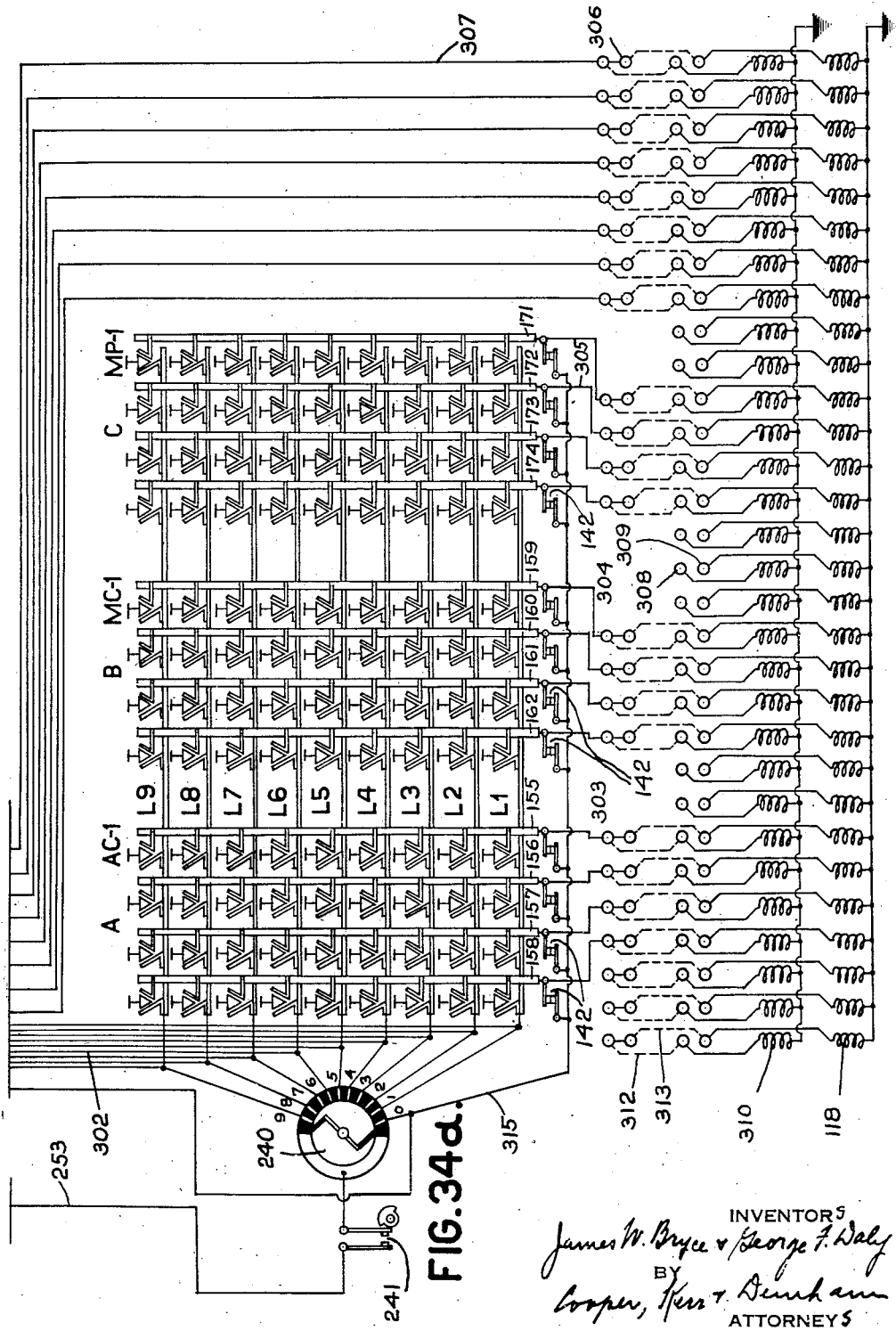

Patented Feb. 21, 1939

2,147,626

UNITED STATES PATENT OFFICE 2,147,626

ACCOUNTING MACHINE

James W. Bryce, Bloomfield, N. J., and George F. Daly, Johnson City, N. Y., assignors, by mesne assignments, to International Business Machines Corporation, New York, N. Y., a corporation of New York Application April 19, 1932, Serial No. 606,132

12 Claims. (Cl. 235—61)

This invention relates to improvements in accounting machines and more particularly to improvements in machines adapted to perform multiplication.

The present invention has for one of its objects the provision of a machine in which amounts can be set up on a keyboard which keyboard is preferably of the 81 keyboard type and which amounts as set up on the keyboard can be rapidly multiplied and the product both printed and punched.

A further object of the present invention resides in the provision of a machine in which a number of amounts such as account numbers, multiplicand amounts and multiplier amounts can be set up upon a keyboard and in which the multiplication of the multiplicand amount by the multiplier amount may be effected and in which, after such computation has been made, the machine will automatically record the account number, the multiplicand amount, the multiplier amount and the product upon a record sheet and in which concurrently with the printing of these amounts corresponding amounts will be punched upon a record card which is automatically presented ready to receive such data.

A further object of the present invention resides in the provision of an electrically controlled multiplying machine provided with an improved cycle controller for expeditiously effecting multiplying computations and dispensing with unnecessary computing cycles in the event that zeros appear in the multiplier.

Further objects of the present invention reside in the provision of improved cycle controlling and column shift control devices, wherein the column shift is controlled by relays and wherein improved cycle controlling zero skipping circuits are provided for controlling the action of the column shift relay mechanism.

Another object of the present invention is to provide an accounting machine in which multiplicand amounts and multiplier amounts can be entered into the machine, multiplying computations performed thereon, and products set up, and in which the products can automatically be printed on a record sheet or the like and punched on a record card or the like; it being a further object to provide such a machine in which multipliers, multiplicands and/or account numbers can also be printed and/or punched; as well as to provide a machine in which the printing and punching devices can be controlled concurrently to record products, multipliers, multiplicands, and/or account numbers.

Another object of the present invention resides in the provision of an improved multiplying machine in which the product may be both printed and punched.

Another object of the present invention resides in the provision of an improved construction of a multiplying machine in which a common impulse emitting means are provided for controlling a printing mechanism and punching mechanism.

A further object of the present invention resides in the provision of an improved multiplying machine in which a printing and/or punching mechanism is provided and in which a common impulse means controls the printing and/or punching mechanism whereby the latter not only prints and/or punches the product but also prints and/or punches the amount of the multiplicand and the multiplier.

It is likewise an object of the present invention for accomplishing any of the objects set forth above by improved and simplified electrical controls and/or controlling circuits.

A further object of the present invention resides in provisions of an improved cycle controller or zero skipping control which is of a type adaptable not only for key controlled multiplying machines, but to multiplying machines generally.

A further object of the present invention resides in the provision of a zero skipping control in which a simplified arrangement of stick circuits for the control magnets is provided whereby each control magnet when energized may establish its own stick circuit.

A further object of the present invention resides in the provision of an improved circuit arrangement in which the column shift relays are disposed in series relation with the multiplication control relays.

A further object of the present invention resides in the provision of multi-contact column shifting relays which are electrically tripped and mechanically controlled and shifted.

A further object of the present invention resides in the provision of a multiplying machine embodying multi-contact column shift relays and multi-contact multiplication control relays with a substantially like construction for both relays.

Further and other objects of the present invention will be hereinafter set forth in the accompanying specification and claims and shown in the drawings, which by way of illustration show what is now considered to be a preferred embodiment of the invention.

In the drawings:

Figures 1 and 1a taken together show the front elevational view of the machine;

Fig. 3 is a front elevational and part sectional view of the multiplying panel and column shift section of the machine, the section being taken substantially on line 3—3 of Fig. 2 and looking in the direction of the arrows;

Fig. 3a is a detail sectional view of certain of the drive parts for the contact cams, the section being taken substantially on line 3a—3a of Fig. 3;

Fig. 4 is a cross-sectional view of the multiplier panel section of the machine. The view is substantially a sectional view taken on line 4—4 of Figs. 3 and 1 and looking in the direction of the arrows;

Figure 16:
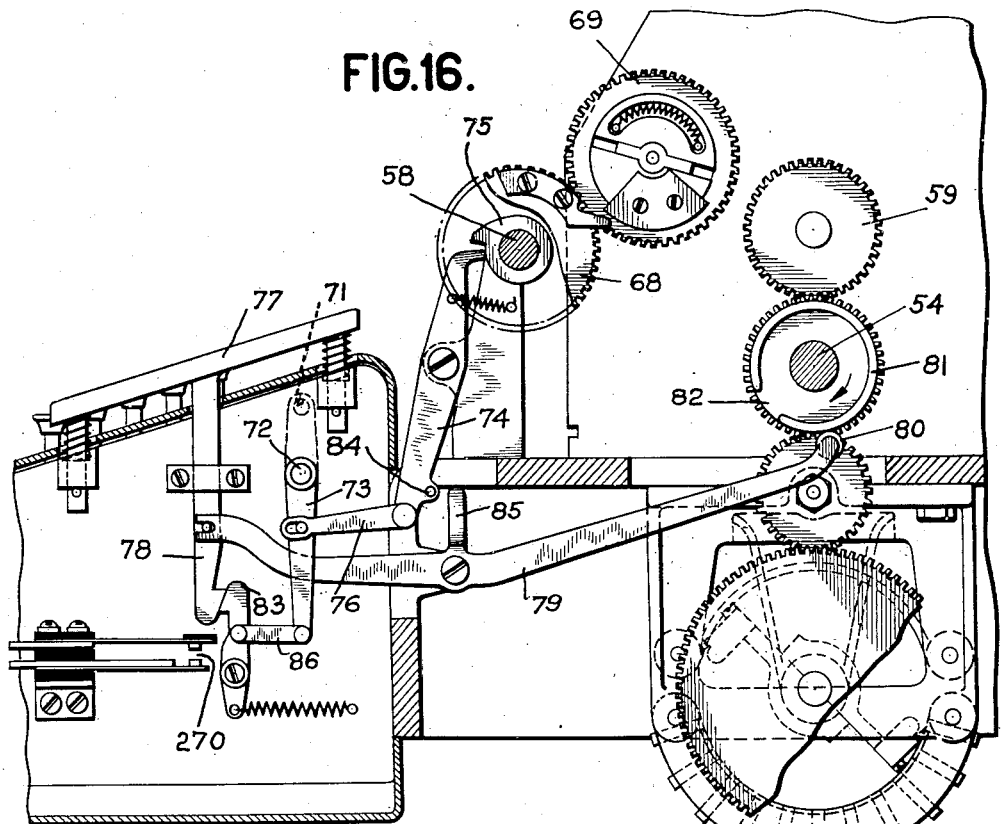
Figure 16A:
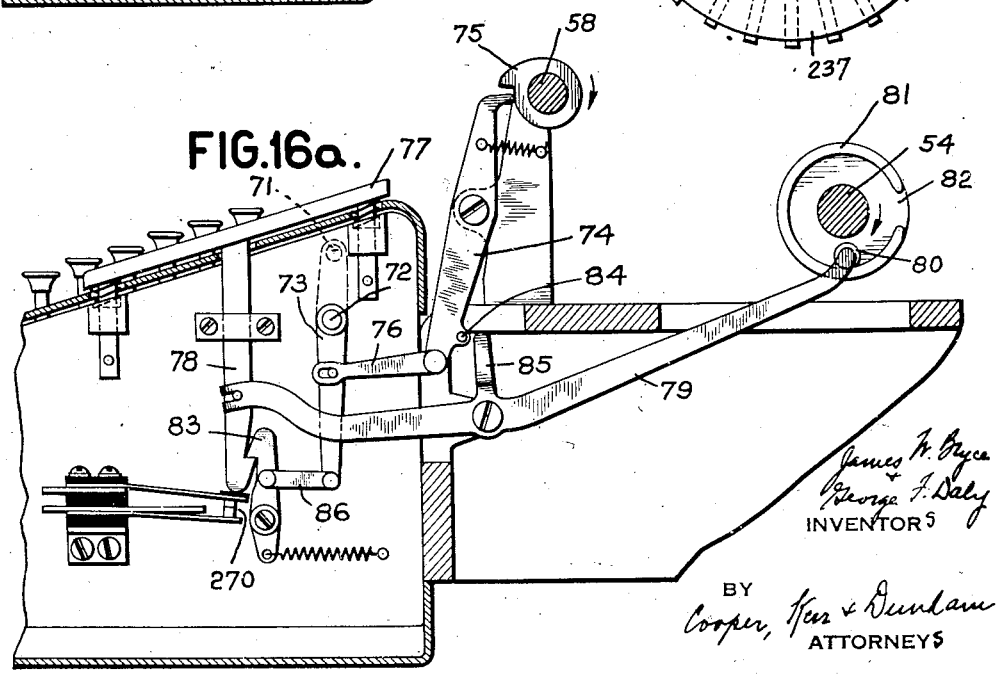
Figure 17:
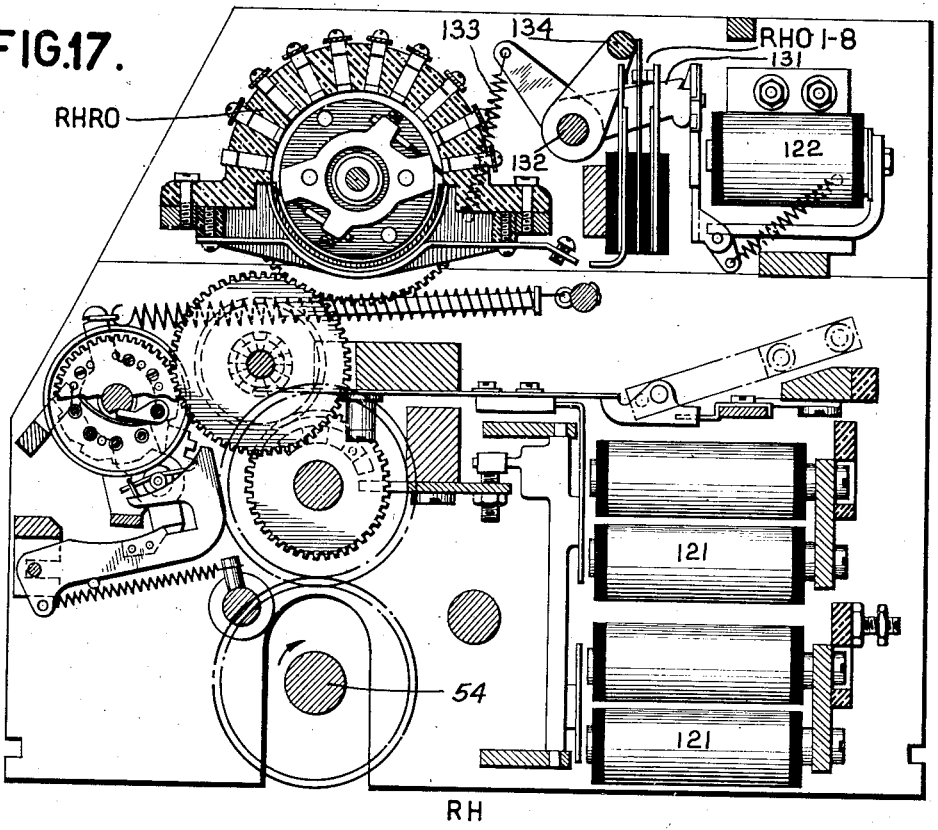
Figure 19A:
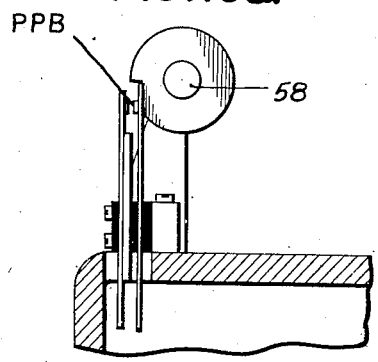
Figure 20:
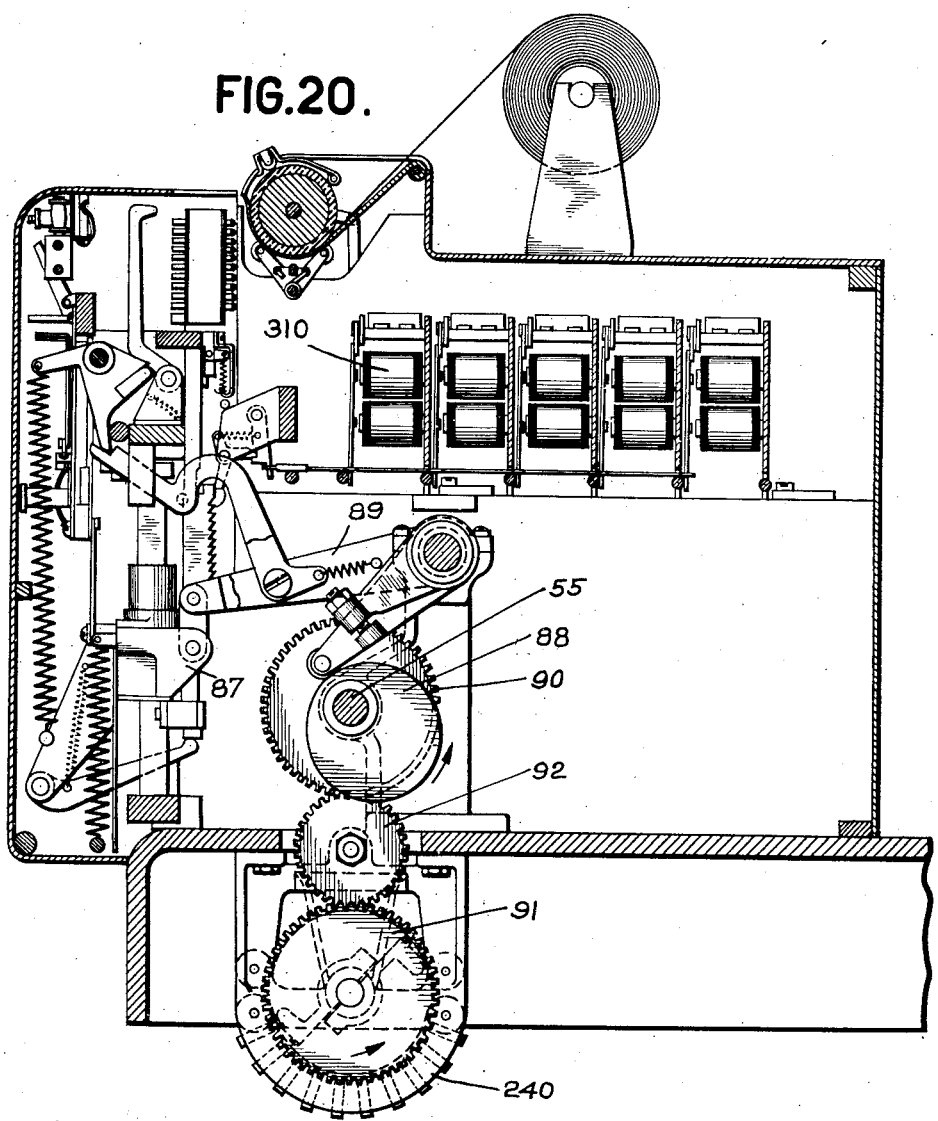
Figure 21:
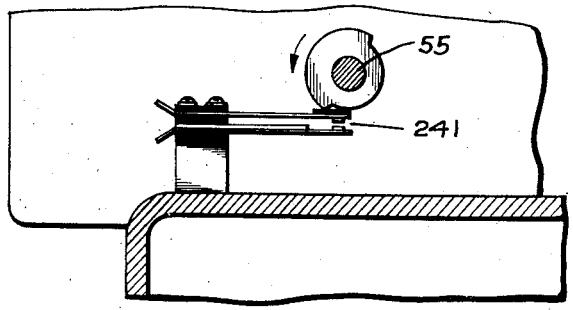
Figure 28:
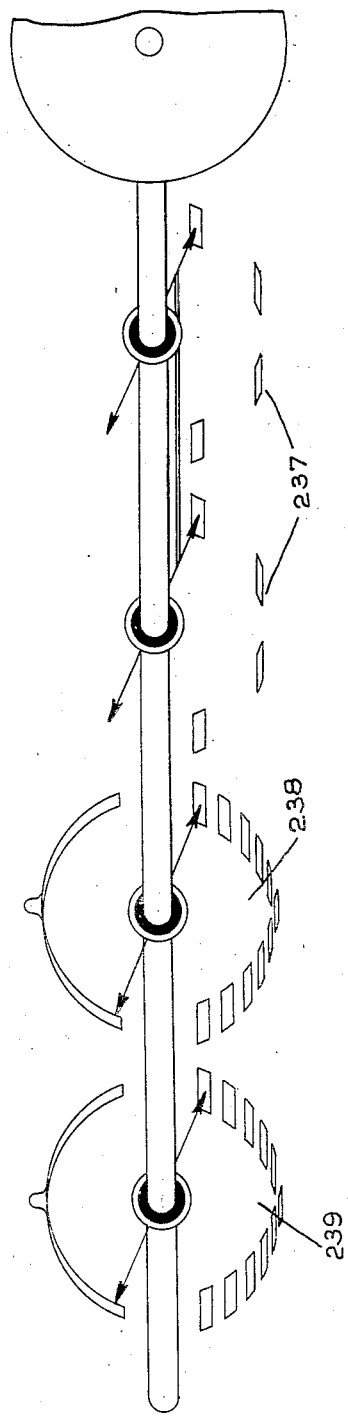
Figure 29:
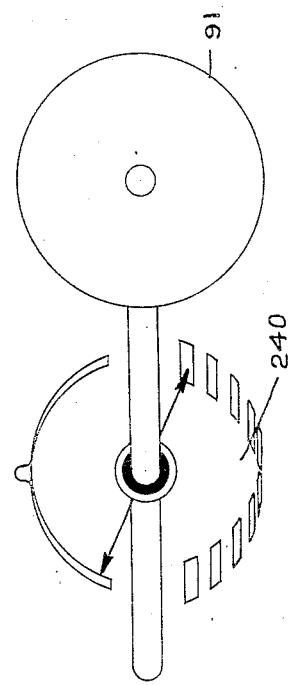
Figures 30, 31, 32:
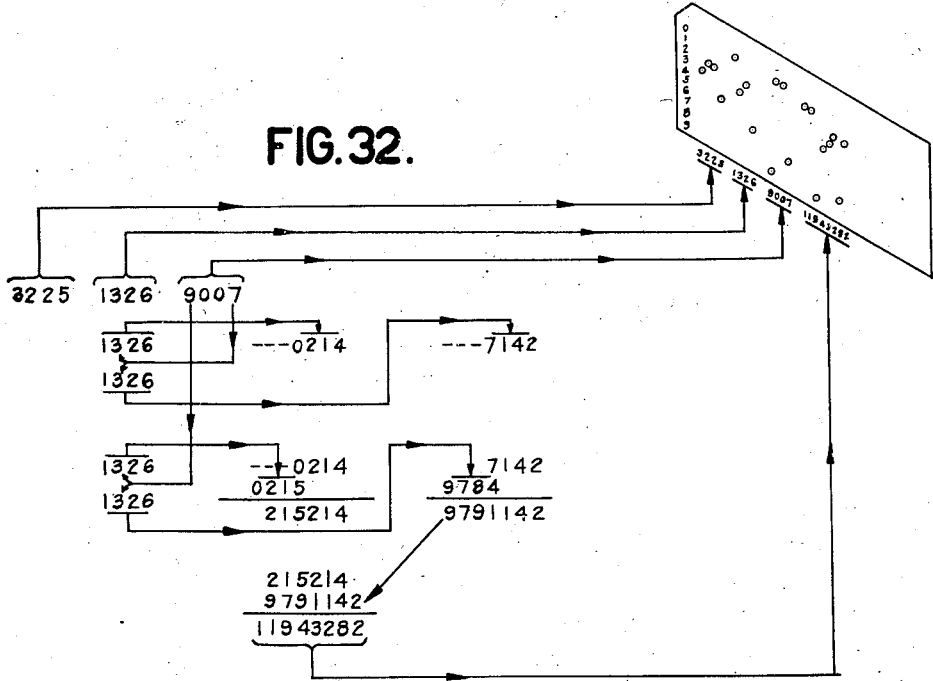

Figs. 5 to 8 inclusive, show positional views of certain parts of the multiplying relay devices;

Fig. 9 is a detail sectional view of certain parts of the column shift relay section of the machine, the section being taken substantially on line 9—9 of Fig. 1 and looking in the direction of the arrows;

Fig. 10 is a detail view of certain of the relay contacts used in the column shift relays;

Fig. 11 is a diagrammatic view showing the wiring associated with the column shift relay devices;

Fig. 12 is a detail sectional view through the keyboard section of the machine. The section is taken substantially on line 12—12 of Fig. 1 and looking in the direction of the arrows;

Fig. 13 is a fragmentary view showing the position of the parts with one of the keys depressed;

Fig. 13a is a fragmentary view showing the contacts associated with the multiplier bank of keys;

Fig. 14 is a transverse sectional view taken through the keyboard of the machine, the view being taken substantially on line 14—14 of Fig. 12;

Fig. 15 is an isometric detail view showing one of the key contact devices of the machine;

Fig. 16 is a detail sectional view taken substantially on line 16—16 of Fig. 1 and looking in the direction of the arrows and showing the motor bar with the associated controls operated thereby and the resetting devices for the motor bar and associated parts;

Fig. 16a is a view of certain of the parts shown in Fig. 16 in moved position and with the motor bar depressed;

Fig. 17 is a sectional view taken through the RH accumulator, the section being taken substantially on line 17—17 of Fig. 1a;

Fig. 18 is a sectional view of certain parts of the driving and resetting mechanism of the machine, the view being taken substantially on line 18—18 of Fig. 1a and looking in the direction of the arrows;

Fig. 19 is a plan view of the parts shown in elevation in Fig. 18;

Fig. 19a is a detail view of certain cam contacts used in the machine. This view is taken substantially on line 19a—19a of Fig. 19;

Fig. 20 is a vertical sectional view of the printing section of the machine, the view being taken substantially on line 20—20 of Fig. 1a and looking in the direction of the arrows;

Fig. 21 is a detail sectional view taken on line 21—21 of Fig. 1a and looking in the direction of the arrows;

Fig. 22 is a detail vertical cross-sectional view of the punching section of the machine, the view being taken substantially on line 22—22 of Fig. 1a; and looking in the direction of the arrows;

Fig. 23 is a side elevational view of the punching section of the machine, the view being taken substantially on line 23—23 of Fig. 1a;

Fig. 24 is a transverse sectional view of the punching section of the machine, the section being taken substantially on line 24—24 of Fig. 23;

Fig. 25 is a diagrammatic view of the readout devices for the accumulating devices or product registers of the machine;

Fig. 26 is a vertical sectional view of these devices; and Fig. 27 is a top plan view of the same;

Fig. 28 is a diagrammatic view of certain of the emitter devices used in the machine; and Fig. 29 is a diagrammatic view of another emitter or circuit timing device;

Fig. 30 is a view showing one of the cards as perforated by the machine;

Fig. 31 is a view of a fragment of the record sheet which the machine is adapted to make;

Fig. 32 is a diagrammatic view showing a typical computation which the machine is adapted to perform and showing the flow of the numerical amounts through the machine and the final perforating of the results and factors upon the record card;

Fig. 33 is a diagrammatic view showing the routing of numerical amounts through the various sections of the machine and particularly through the keyboard sections, the multiplier relays, the registers and to the final printing and punching mechanism; and Figs. 34a, 34b, 34c, and 34d taken together and arranged vertically in the order named, show the complete circuit diagram of the machine.

Before describing the detailed operation of the machine a brief description will be given of the main units of the machine.

The machine includes a keyboard section generally designated K in Fig. 1, which keyboard is provided with three banks of keys designated A, B and C respectively. Keys A are class designating keys. The keys generally designated B are the multiplicand keys and the keys generally designated C are the multiplier keys. The keyboard is of the typical 81 key type and while four banks of keys are shown for the multiplier, multiplicand and class selection purposes, it will be understood that any number of banks of keys may be employed. The machine also includes an RH accumulator designated RH on Fig. 1a and an LH accumulator or product register designated LH on Fig. 1. The machine also includes a multiplying panel unit generally designated D in Fig. 1 and a column shift unit generally designated E in this figure.

The machine further includes a printing section and there is also a separate punching section. These units are respectively designated PR and PU in Fig. 1a.

Before describing the detailed operation, it may be stated that with this machine it is intended that amounts are to be set up on the keyboard K and that thereafter a motor bar is to be operated. The machine then automatically is set into operation and the multiplicand amounts are multiplied by the multiplier and the partial products are entered into the RH and LH accumulators. Thereafter there is a gathering together of the products into one accumulator and subsequently the product is read out from this accumulator and this product together with the multiplicand amount, the multiplier amount and the class amount as derived from the keyboard are recorded by the printing mechanism and similar amounts are also punched by the punching mechanism. The machine is then automatically set in condition for another computation. The operation of printing and punching are effected concurrently.

Figure 2:
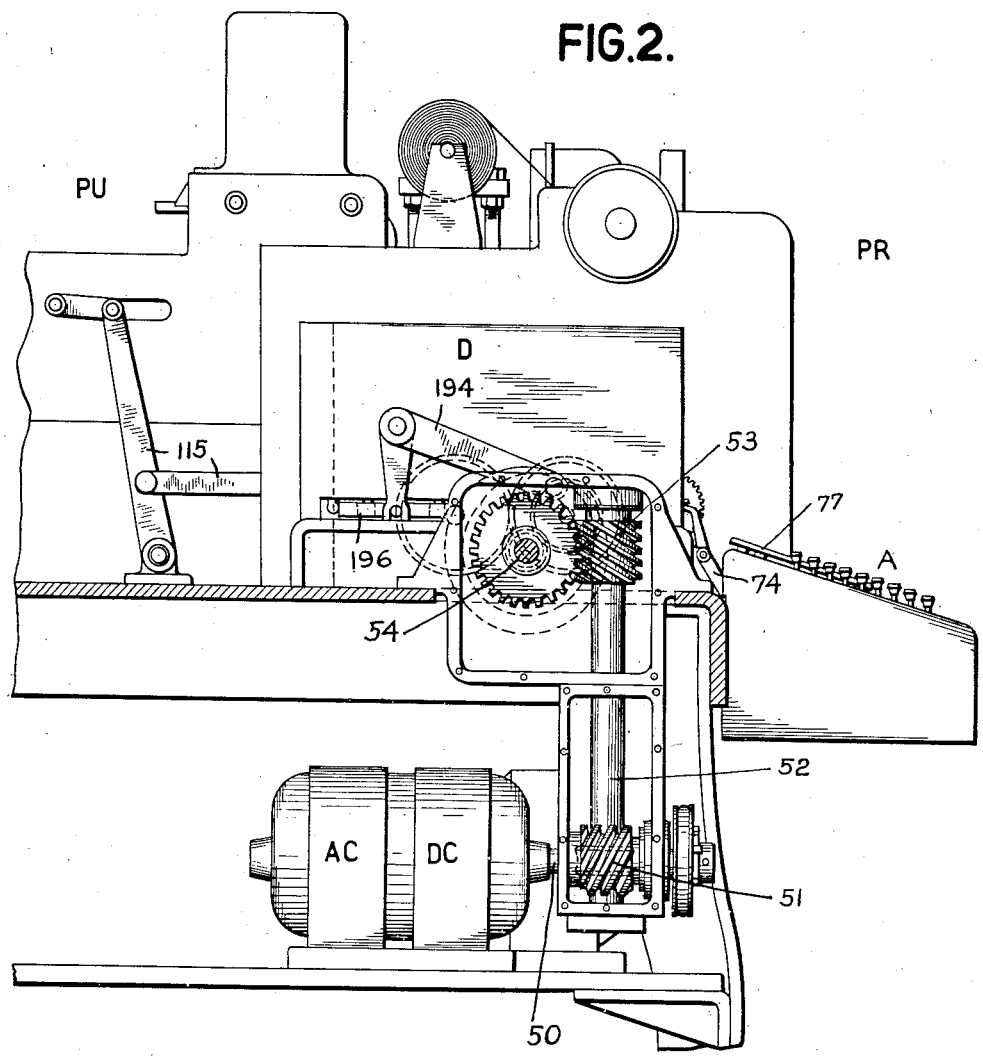
Fig. 2 is a side elevational and part sectional view, the view being taken substantially on line 2—2 of Fig. 1 and looking in the direction of the arrows.

Referring now to Fig. 1, the machine is provided with the usual driving motor M which through a belt drive and a one-way ratchet drive drives the shaft 50 (Figs. 1 and 2) which in turn drives an AC DC generator unit designated AC DC on Fig. 2. The shaft 50 also, through worm gearing 51 drives a vertical shaft 52, which through worm gearing 53 drives the main driving shaft 54. This main drive shaft extends transversely across under the multiplier panel section D, the column shift unit E, the RH and LH accumulators and drives these accumulators in the usual manner. The main driving shaft for the printing unit is designated 55 and this shaft is adapted to be clutched to shaft 54 in a manner to be hereinafter explained. 56 is the main drive shaft for the punching unit and this shaft is always driven concurrently with the printing unit main drive shaft 55 by gearing 57 (Fig. 22). It will be understood that shaft 55 of the printing unit, through gearing 57, drives the punching unit main drive shaft 56. The machine is also provided with a reset shaft 58 (Figs. 1 and 1a) which shaft resets the RH accumulator and the LH accumulator and also controls the resetting of the keyboard section of the machine.

Referring now to Figs. 18 and 19, the main drive shaft 54 drives the LH and RH accumulating devices in the customary manner as by gearing 59. Also fixedly mounted on the main drive shaft 54 is a gear 60, which gear in turn drives a gear 61 loosely mounted on shaft 55. Fixed to gear 61 is the clutch member 62 of a one revolution clutch, the other member of which, 63, is fastened to shaft 55. The usual clutch pawl 64 is provided and is adapted to be tripped by a member 65 which is electromagnetically actuated in the customary manner. Such clutches are shown in Lake Patent No. 1,600,413, dated September 21, 1926, see Fig. 19, and in Lake Patent No. 1,822,594, date September 8, 1931, see Fig. 4. Provision is made for operating the reset shaft 58 by the operation of the printer drive shaft 55. For this purpose shaft 55 is provided with a mutilated gear 66 which at the proper time in the cycle of operation of shaft 55 is adapted to drive a gear 67 disposed on reset shaft 58. The reset of the LH and RH accumulators is effected through gears 68 which resets the accumulators in the customary manner. Resetting devices of this type are fully described in United States patent to Lake, No. 1,600,414, dated September 29, 1926. Gear 69 (Figs. 18 and 19) corresponds to gear 385 of the above mentioned Lake patent.

From the foregoing description it will be understood that the counters of the machine are reset as an incident to and during the latter part of the cycle of operation of the printing and punching units of the machine.

It may be stated that the keyboard section is also reset, the keys being released, the motor bar being restored to normal position by the operation of the reset shaft 58 which is employed for resetting the accumulators.

*Keyboard reset*

As is customary in 81 key machines, the keyboard is provided with key latch bars such as 70 (Fig. 12). Such key latch bars latch the keys down in the usual manner and are disposed for cooperation with a cross bail 71, which cross bail upon being rocked in an anti-clockwise direction thrusts the latch bars 70 forwardly, i. e. to the left, releasing any depressed keys which have been latched down (see also Fig. 13). The cross bail 71 is carried upon a shaft 72 (see Figs. 12, 14 and 16). Shaft 72 has fast to it a depending arm 73. For releasing the keys, the operating connections to the shaft 58 are as follows: A member 74 is suitably pivoted upon a frame part of the machine and such member is provided with a nose portion cooperating with a cam 75 fixed upon the reset shaft. Upon rotation of the reset shaft, member 74 is rocked anti-clockwise drawing forward a link 76, which link through a lost motion connection cooperates with the member 73 previously referred to, thus releasing the keys.

*Motor bar operation*

In the operation of the machine the computing operations are initiated by the manual operation of a motor bar 77 (Fig. 16). Before computing operations are commenced the motor is set in operation by the closure of the switch 250 (Fig. 34a) which supplies current to the motor, thereafter and with the motor in operation, the motor bar may be manipulated. Provision is made for preventing operation of the motor bar until the machine is in proper cyclic time for having the motor bar operated. This may be effected by providing the motor bar with a depending member 78 which member 78 has a pin and slot connection with a pivoted lever member 79. 79 at its right hand end is provided with a follower roller 80 which is in cooperation with an annular member 81 disposed on shaft 54, and rotating in unison therewith. Annular member 81 is provided with a notched out portion 82. From Fig. 16 it will be seen that the motor bar cannot be depressed until the member 81 is in position to present the opening 82 in alignment with the follower 80. At such time the motor bar can be depressed. The motor bar is then latched down by a latch 83 (see Fig. 16a). With the stem 78 of the motor bar thus latched down contacts 270 will be closed. Provision is also made to mechanically restore the motor bar from the depressed position shown in Fig. 16a to the raised position shown in Fig. 16. For this purpose member 74 is provided with a pin 84 adapted to cooperate with an upstanding arm 85 upon member 79. Upon member 74 being rocked anti-clockwise, 84 cooperates with 85 and rocks member 79 in a clockwise direction withdrawing the follower 80 from the annular ring 81 through the opening 82 at the proper time in the cycle of rotation of shaft 54. Previous to this withdrawal latch 83 is released mechanically. Release of the latch 83 is effected by means of a link 86 which connects the latch 83 with the lower end of member 73. The relation of parts is such that the latch 83 is withdrawn just before the member 79 is rocked clockwise and the rocking of member 79 in a clockwise direction is effected at the time when the follower 80 is opposite notch 82.

It will be understood that for this purpose, cam 75 is properly timed with respect to member 81.

Printing section

The printing section of the machine is of conventional tabulator construction and requires no detailed description. It is sufficient to state that the crosshead reciprocator 87 of the printing section (see Fig. 20) is reciprocated by means of a cam 88 disposed on the main printing drive shaft 55. In other respects the printing section is similar to the printing section of the tabulating machine shown in the United States patent to Lake, No. 1,822,594, issued September 8, 1931. The crosshead operator 89 corresponds to part 306 in Fig. 2 of the patent to Lake and in the present embodiment cam 88 takes the place of cam 301 of the said patent and a different manner of drive is provided for the shaft 55 which shaft corresponds to shaft 315 of the said patent.

Emitter drive in printing section

Certain emitter devices are provided in the printing section of the machine which emitters are used for taking over the readings to the printing section of the machine. The emitters will hereafter be described in detail, but their drive is effected as follows: A gear 90 is fixed to the shaft 55 in the printing section of the machine (see Figs. 20 and 1a). Such gear 90 drives emitter drive gear 91 through an intermediate gear 92.

Punching section

The punching section of the machine is of the gang punch type, substantially similar to the gang punch shown in the copending United States application of James W. Bryce, Serial No. 258,165, filed March 1, 1928 and also shown in British Patent No. 307,025, dated May 28, 1930 and British Patent of addition No. 329,983 of the same date. Substantially the only difference between the present punch and the punch therein fully described is that the brush reading station shown at 72 in the said application and British patents has been eliminated and one set of feeding in rolls eliminated.

The punch main drive shaft 56 is provided with a gear 94 (Figs. 23 and 22) which gear 94 drives a gear 95 (see Fig. 24), which gear in turn has fast to it a gear 96 in mesh with the gear 97 fast to one end of a feed roll shaft 98. Feed roll shaft 98 extends through to the opposite side of the machine and by the driving train of gears generally designated 99 drives the various feed rolls 100 in unison. Feed roll 100a is not a positively driven roll but is a frictionally driven roll.

Referring to Fig. 22, 101 is a card magazine of the usual type. 102 is a card picker which is actuated by picker cam 103 secured to shaft 56. By the rotation of shaft 56 a card is advanced from the magazine into the first pair of the feed rolls 100 and is thence carried by the feed rolls into the die plates 104. The card is arrested in proper alignment in the die plates by a stop 106 which stop is kept in elevated position against the tension of the spring 107 by a cam follower bell crank 108, which cooperates with a cam 109 fixed to shaft 56. When the card is in the die the lower of rolls 100a slip relatively thereto and delivery of the card is prevented by the stop 106. At the proper time in the cycle of the machine when this stop is lowered, the card is ejected from the die and picked up by the succeeding feed rolls and delivered to the stack 110.

During the period that the card is in the punching die it is punched. The punching device comprises a number of punches 111 arranged in rows and for each row of punches an interposer selector 112 is provided. The punch selectors 112 are advanced to selected positions over the tops of the punches by an impositive drive mechanism which comprises a bar 113 have pawls 114 mounted thereon, one for each column and for each punch selector interposer bar. 113 is moved to the left as viewed in Fig. 22 by a linkage 115 having a cam follower cooperating with a cam 116 fixed on shaft 56. The differential movement of the selectors 112 is determined by the stop pawls 117, which pawls cooperate with ratchet teeth upon the selector bars. Tripping of the pawls 117 is effected through punch selector magnets 118. The punch selector magnets 118 and associated armature parts are arranged to trip the pawls in the customary manner.

It will be understood that if a given selector bar or bars have their interposer ends over a particular punch or punches that upon elevation of the punch die such punches will be forced through the card. Reciprocation of the punching dies is effected by a punch cam 119 (Fig. 23) which cooperates with a follower 120. It will be also understood that the upper of the rolls 100a is carried by a part of the die and is raised during the punching action, again coming into cooperation with the lower roll 100a by the return of the upper die.

Product receiving devices and registers

The registers are of conventional construction used in tabulating machines and are substantially of the form shown in reissue patent to Lake No. 16,304, dated March 30, 1926. In lieu of the stepped cam readout devices as therein described, a different form of commutator readout mechanism is employed in these registering devices. Fig. 17 shows a typical accumulator and Figs. 25 to 27 inclusive show the readout device therefor.

It may be explained that the RH register and readout is shown in Fig. 17, but that the construction of the LH register and its readout is identical so that a description of one will suffice for both. The register shown in Fig. 17 is provided with the usual counter magnets designated 121 and is provided with a relay magnet 122 which will hereinafter be referred to as an RH trip magnet. It is also provided with a commutator type of readout device generally designated RHRO in Fig. 17. The detail construction of this readout device and of the similar readout device employed on the LH register will now be given.

Referring to Figs. 25 to 27 inclusive, it will be noted that the segment spots 123 are common to two sets of brushes designated 124 and 125 which brushes cooperate respectively with conducting segments 126 and 127. Brush 124, as is shown in Fig. 25, is driven from the units order clutch gear 128. Brush 125 is driven by the tens order clutch gear 129 by the gearing diametrically illustrated. A similar arrangement of brushes and readout spots is provided for the relatively higher orders of the accumulator. The various segments of the readout mechanism are transversely connected by transverse buses generally designated 130 in Fig. 27.

Referring now to Fig. 17, the RH trip magnet 122 when energized is adapted to attract its armature and release a latch arm 131 fixed to a shaft 132 which is normally urged to rock in an anticlockwise direction by a spring 133. A bail 134 is also fixed to the shaft 132 and such bail cooperates with the double blade contacts RHRO 1 to 8 inclusive. Upon attraction of the armature of magnet 122 and the release of the armature from the latched member 131, the contacts shift by their own spring action to reverse position from that shown. Restoration of the contacts to the position shown and the relatching of member 131 with the armature is effected by the mechanism shown on Fig. 13. A member 135 is fixed to the shaft 132 which carries the bail 134, and member 135 is adapted to be rocked at the proper time in the operation of the machine by a lever 136 which has a nose portion cooperating with a cam 137 secured to the main drive shaft 54. This arrangement of parts will act to relatch and restore contacts RHRO 1 to 9 once per cycle provided they have been previously unlatched by energization of the magnet 122.

Keyboard section and controlling contacts

Referring now to Figs. 12, 13 and 14, as has been previously explained, the keyboard sections comprise three groups of keys, A being the classification keys, B being the multiplicand keys and C being the multiplier keys. The keys are spring urged towards upward position in any suitable manner as by means of springs 140 and when depressed are latched down by the conventional latch bars 70 which have been previously referred to. In addition to the latch bars 70 which are provided one for each bank of keys, supplemental control or zero bars 141 are also provided for each key bank. Upon the depression of any key in a column or bank the corresponding bar 141 of that bank is cammed outwardly to the right in Fig. 12 by the camming edge on the key shank and the outward movement of such bar 141 is adapted to open contacts 142 (see Fig. 13).

With the foregoing construction it will be understood if a key in any given bank is not depressed its bank contact 142 will remain closed, but if any key in a bank is depressed, such contact 142 will be opened in the manner indicated in Fig. 13.

Zero bars 141 and zero contacts 142 are provided for the various banks of classification keys, the various banks of multiplicand keys and the various banks of multiplier keys. On the zero bars which are operated by the multiplier keys, a supplemental contact is provided for each zero bar. Such supplemental contact is shown in Fig. 13a and is here designated 142u, the designation u signifying that the contact is related to the units bank. On the tens multiplier bank the corresponding supplemental contact is designated 142t, on the hundreds bank it is designated 142h and on the thousands bank it is designated 142th as will hereinafter appear in the description of the circuit diagram. It may be explained that the supplemental contacts 142u, 142t, 142h and 142th are used for cycle controlling purposes and that the contacts designated 142 are used for controlling the printing and punching of zeros.

The members 143 (Fig. 14) serve as spring anchorage and key guides. The members 144 likewise serve as key guides and limit the downward stroke of keys in the manner indicated in Fig. 13.

Key control contacts

It may be explained that the so-called A keys which are account number list keys, are provided with only one set of contacts, these contacts being used for listing the account number. The contacts associated with the multiplicand keys include three separate sets of contacts. Certain of these contacts are list contacts and may be termed MC list contacts or MC—1 contacts.

Other contacts on the multiplicand key stems are used for left and right hand component controlling purposes and these may be designated MCLH and MCRH. With the multiplier key stems there are two sets of contacts, one being MP list controlling contacts which will be designated MP—1 and the other being the multiplication controlling contacts which will be termed MPX contacts.

Extending transversely across under all of the upper sets of contacts, viz. AC—1, MC—1, MP—1, are sets of transverse buses, one bus being individual to each transverse row of keys. Accordingly, there is one bus designated L—9 for the nines row of keys, one bus generally designated L—8 for the eight row of keys and so on.

A typical key contact construction is shown in Fig. 15. In this figure, 150 is a key shank. 151 is a block of insulating material carried by the key shank and having on its lower portion a V-shaped contact element 152. Upon depression of a key this V-shaped contact element 152 is adapted to establish an electrical circuit between a member 153 and a member 154. Member 153 is carried by a conducting bus 155 which is common to a plurality of keys in a single bank. The transverse buses such as L—9 previously referred to, are electrically connected to the contact elements 154 of a transverse row of keys. Buses 155 are mounted in insulating brackets in the frame of the machine as indicated in Fig. 12.

The contact arrangements of the type shown in Fig. 15 are used on all of the various key contacts in the machine, but inasmuch as different bus arrangements are employed different numbers will be given designating these particular buses as follows: The bars corresponding to 155 on the account listing AC—1 section are 155 for the units order, 156 for the tens order and 157 and 158 will be for the hundreds and thousands order respectively and will be so shown on the wiring diagram, although they are not so shown on Fig. 14, the other two-key stems not being delineated.

On the multiplicand list section (MC—1) these bars for the units place will be designated 159, the tens will be designated 160, the hundreds 161 and the thousands 162. Similar bars such as these in the multiplicand section are provided cooperatively associated with the contacts MCLH, such bars being designated 163 for the units, 164 for the tens, 165 for the hundreds and 166 for the thousands. For the MCRH contacts the bars will be respectively designated 167 to 170 inclusive.

Transverse buses similar to the L 1 to 9 buses are also provided in the multiplicand section. These will have the general designation MB and MA and have the numerical designation 1 to 9 according to the value of the keys with which they are associated. The MB buses cooperate with the MCLH contacts and the other set of buses MA cooperate with the MCRH contacts. Buses MA and MB are individual to the multiplicand key section of the machine and do not extend into cooperation with either the multiplier or C section or the classification or A section.

The bank buses similar to 155 of Fig. 15 are, in the multiplier section, respectively numbered 171 for the units, 172 for the tens, 173 and 174 for the hundreds and thousands, these being the bank buses for the MP—1 set of contacts. For the MPX contacts the bank buses are respectively numbered 175, 176, 177 and 178. Individual transverse buses are also provided in the MP or C section of the machine similar to L 1 to 9 previously referred to and such transverse buses will be generally designated MM and individually designated MM 1 to 9 depending upon the value of the transverse row of keys to which they are related. Such MM buses also are individual to the multiplier section of the machine and do not have any cooperation or extension into the multiplicand section or the classification section of the keyboard.

*Multiplying relay section and column shift section*

For controlling the producing of partial products, electro-mechanical multiplier relays are provided and similar electro-mechanical relays are also used for column shifting purposes. The multiplier relays are disposed in the D section of the machine as shown in Fig. 1 and the column shift relays are disposed in the E section. The multiplier relays are electromagnetically controlled and certain shifting actions are produced mechanically. For effecting the mechanical shifting action a cam 190 (Figs. 1, 3 and 4) is provided disposed on the main drive shaft 54 and for effecting shifting movements of the column shift relay contacts a cam 193 is provided also disposed upon and driven by shaft 54 (see Figs. 3 and 9). Inasmuch as the parts in the column shift section are identical so far as mechanical construction is concerned with those in the multiplier relay section, similar reference numerals will be used and it will be understood that the suffix S will be applied to corresponding numbered parts in the column shift section. A cam follower member 194 cooperates with cam 190 and shifts a forked arm member 195 (Figs. 3 and 4). Member 195 engages a serrated operating bar 196 slidably mounted as shown in Fig. 4. The frame of the multiplier panel section of the machine is suitably slotted to receive a number of vertical plates 197 spaced apart from each other as shown in Fig. 4. Carried on each plate 197 is a magnet which will be generally designated X. These magnets are the multiplier control magnets and when energized serve to control the establishment of certain contacts in the multiplier relay control section of the machine. Preferably such magnets X are used as trip magnets only and the armatures of these magnets are not required to actually shift their related contacts. Shifting of the contacts, after the magnets have been energized is effected in the manner which will now be described.

As previously explained, cam 190 is adapted to shift the serrated operating bar 196 (Fig. 4). This serrated operating bar is disposed below one side of the base of the control relay section of the machine and into a serration of this bar extends the arm 198 of a contact operating bail structure.

Referring now to Fig. 3 a rock shaft 200 is suitably journaled upon each of the plates 197 and the arm 198 is fixed to the end of the rock shaft 200 in any suitable manner. At the opposite end of rock shaft 200 there is another upwardly extending arm 201 which is also fixed to the shaft. Intermediate 198 and 201 is a transverse cross bail 202 of insulating material. The bail member 202 cooperates with a set of contact blades generally designated 203 (see Figs. 6, 7 and 8). Each plate 197 has also secured to it and insulated therefrom one set of these contacts 203. In cooperation with these contacts are other sets of contacts 204 which contacts are also carried by each plate 197 and insulated therefrom and from the other set of contacts 203. The contacts 203 are provided with individual binding posts 205 (see Fig. 8) and the contacts 204 extend downwardly and are provided with plug end prong portions 206, which extend into plug clips 207. On the column shift section of the machine (see Figs. 9 and 10) binding posts 205 are dispensed with and in lieu thereof the contacts extend into plug sockets which will be correspondingly designated 205s. All of the clips 207 in a common transverse row are connected by common transverse bus connections, see 209, (Fig. 3). These bus connections it will be understood cross under the various sets of plates 197. The purpose of these bus connections is to provide current supply to the various plug clips.

Referring now to Figs. 5 to 8 inclusive, each arm 201 extends upwardly beyond the insulating cross member 202. This upwardly extending portion on Fig. 3 is indicated at 201a. At its upper end, such portion 201a carries an armature restoring screw 210 for the purpose of knocking off the armature of the X magnet. The armature 211 of each X magnet is suitably pivotally mounted and such armature is provided with an arm portion which extends in the rear of the screw 210, such arm portion is indicated at 208 in Figs. 3, 5 to 8 inclusive. Each armature 211 (see Figs. 5 and 6) is also provided with a latch portion 212. Pivotally mounted with respect to arm 201, preferably upon the end of the cross bail 202 is a fork shaped member 213 provided with one fork having a lug portion 214 which is turned out between the latch 212 and the member 201 and another forked portion 215 which is turned out and disposed on the opposite side of the arm 201. The forked member 213 is normally rocked in an anti-clockwise direction with respect to member 201 by a spring 216, which spring at one end is anchored to member 201 and which at the opposite end is anchored to a pin or post 217 upon the right hand fork of member 213, (see Fig. 8). With the contacts 203 and 204 opened the contact pressure of contacts 203 will tend to rock 201 and 201a in an anti-clockwise direction causing 201a to be pressed against 214 and 214 to press against the latching nose 212 of the armature 211.

It may be explained that in the operation of the machine there is a cam operation of the serrated bar 196 which operation causes bar 196 to be shifted to the left (see Fig. 5) which shifting movement rocks 198 clockwise, 201 and 201a clockwise bringing screw 210 into contact with 208 rocking the armature clockwise and positively knocking off the armature and relatching it, provided the same was previously tripped. After this action has occurred the serrated bar 196 is allowed to move back to the right which permits 201a to swing slightly anti-clockwise clearing 210 from 208 and leaving the parts in the position shown in Fig. 6. In this figure it will be noted that 201a is not in contact with 214 so that accordingly the spring pressure of contacts 203 is not applied against the latching nose 212 through 214. The latching pressure is only the pressure of the spring 216.

The next operation is to energize one of the X magnets which attracts the armature 211 and releases the latch. The member 214 then under spring action snaps over the top of 212 and following this there is a further movement of serrated bar 196 to the right which allows 201 to swing further anti-clockwise until contacts 203 and 204 close. This position of the parts is shown in Fig. 7. Fig. 8 shows the position of parts when an X magnet is not energized but with the member 201 swung to its limit in an anti-clockwise direction and contacting with 214.

By the above contact operating arrangement the load of unlatching the armature from its latch point is removed prior to the unlatching operation. Furthermore, displacing of the bail 202 against the spring contacts 203 to open up these contacts against their spring action is effected mechanically by the serrated bar 196 and furthermore mechanical power is utilized for restoring the armatures and for mechanically relatching such armatures as have been previously unlatched. It will be understood that there is one X magnet for each plate 197 and that there are a set of contacts 203, 204 for each X magnet.

The construction of the parts in the column shift section of the machine is substantially identical and the description thereof need not be repeated. It is sufficient to here state that only four column shift control magnets are provided. Such column shift control magnets are respectively designated CSu, CSt, CSh and CSth (see Fig. 9). These magnets in action correspond to the X magnets previously described but these magnets are used for column shift control purposes instead of multiplier relay control purposes.

Referring again to Fig. 3 it has been previously explained that extending under the set of contacts 204 there are bus bars 209 provided with plug clips 207 to receive the prongs 206. Also disposed transversely under the plates 197 and to the extreme right in Fig. 3 are a set of bus bars 225 which are also provided with plug clips 226. Cooperating with these plug clips are prongs 227 which are carried on insulating strips on plates 197. Each of the prongs 227 is provided with a suitable binding screw terminal as shown on the circuit diagram. The arrangement of multiplier panels herein shown and described is substantially the same as set forth in application of James W. Bryce, George F. Daly and James M. Cunningham, Serial No. 554,490, filed August 1, 1931.

In the column shift section of the machine, in lieu of using the simple transverse buses 209 and 225 previously referred to and as is shown for the multiplier panel arrangement a different arrangement is provided. On the column shift section plug sockets 207s and 205s are provided with binding screw terminals which project through the insulating base 233 as shown. Such binding screw terminals are respectively designated 228 and 229 (see Fig. 10).

As shown in Fig. 11 the various 229 binding screw terminals in a single vertical row are wired in common by wiring indicated at 230. Binding screw terminals 228, however, are differently connected, being connected by sloping or diagonal wiring connections such as 231, 232 for example. It will be understood that the wiring 230, 231, 232 is on the bottom of the base plate 233 and accordingly such wiring 230, 231 and 232 is shown by dotted lines in Fig. 11. To the uppermost right hand set of the binding screws 229 feed in buses 290 extend and to the uppermost left hand set of binding screws 229 feed in buses 291 extend.

*Miscellaneous emitters and cam contacts*

Disposed in the base of the machine below the column shift section E and suitably gear driven from the shaft 54 (see Figs. 1 and 3) are cams which operate cam contacts PPA, cam contacts 236 and cam contacts RHT.

Disposed in the base of the machine below the LH accumulator (see Fig. 1) and gear driven from the shaft 54 are a number of emitters which comprise a double brush emitter 237 (see Fig. 28) with each brush traversing a set of segment spots and with the brush electrically connected to permit the double emitter to be used as a sequential switching device and two single emitters 238 and 239. Each single emitter is provided with a brush structure with one brush traversing a single set of segment spots and with another brush traversing a single supply segment.

There is also an emitter which will be designated 240 disposed below the printing section of the machine and which emitter is driven by the gear train 90, 92 and 91 previously referred to. Such emitter 240 is shown in Figs. 1a and 20 and is also shown diagrammatically on Fig. 29. There are also certain cam contact devices provided in the machine, one of such cam contacts which is driven by the printing shaft 55 has its location indicated on Fig. 1a to the left of the section lines 21—21. Such cam contacts are designated 201 and are also shown in Fig. 21. There are also cam contacts driven by the reset shaft 53 of the machine (see Figs. 19 and 19a), such cam contacts are designated PPB.

Before describing the circuit diagram of the machine a brief explanation will be given of the showing in Fig. 33, which shows diagrammatically the flow of the computations and calculations through the various units of the machine.

In the operation of the machine the amount of the multiplier is set up on the C keyboard. The amount of the multiplicand is set up on the B keyboard and the class or group number is set up on the A keyboard. The setting up of the multiplier keys controls the zero section contacts 142, 142u, 142t, 142h and 142th and the 142u to 142th contacts in turn control the so-called column set up or cycle controller action. Upon the operation of the motor bar, and after the cycle controller has been set up in a manner to be hereinafter explained, the emitter 237 comes into action and impulses from this emitter flow through the column set up relays which are under the control of the zero section contacts 142u to 142th of the multiplier keyboard and such impulses flow through the MPX contacts in the multiplier keyboard to the D section of the machine which includes the multiplier relays with their X 1 to 9 magnets. After these magnets have been selectively energized and the relays tripped off the emitter 238 comes into action and impulses are emitted through the multiplier relay contacts in the D section of the machine through the MCLH and MCRH contacts of the multiplicand keyboard and thence through the column shift relays so that RH and LH components of partial products are introduced into the LH and RH accumulators in the manner indicated on Fig. 33. It will be understood that successive partial products may be entered into these accumulators for multiple figure multipliers. After the partial products are completely entered into the LH and RH accumulator devices, the emitter 239 comes into action. The impulses from this emitter flow through the RHRO readout devices associated with the RH accumulator. The amounts standing on the RH accumulator are introduced over into the LH accumulator. The machine is now ready for a recording and punching operation. The printing and punching section of the machine comes into action and the emitter 240, which is associated with the punching section of the machine emits impulses in time with the operation of the printing section and in time with the operation of the punch selection action of the punch. Such impulses flow by several paths. One path of impulse flow is through the LHRO readout devices associated with the LH accumulator. These impulses read off the amount from this LH accumulator and control a section of the printing and punching mechanism accordingly. Other impulses from the emitter 240 flow into the account list section of the machine and thence flow both to the printing and punching section. Impulses also flow through the multiplicand list section (MC list) and the multiplier list section (MP list). The contacts in these sections control the flow of impulses into the printing and punching section so that the account number, the multiplicand amount and the multiplier amount are set up on the printing and punching mechanism.

The above in brief traces the sequential operations which the machine is intended to perform.

A more detailed statement will now be given in connection with the circuit diagram. In discussing the circuit diagram a typical illustrative computation will be considered. It will be assumed that the account number which is to be set up on the A keyboard is 3225, that the multiplicand is to be 1326 and that the multiplier amount to be set up on the C or multiplier keyboard is 9007.

Referring to the circuit diagram, Figs. 34a to 34d inclusive, it has been previously explained that the keyboard section of the machine includes account number keys, multiplicand keys and multiplier keys. The single controlling contacts of the account number keys are designated AC—1 on the circuit diagram (Fig. 34d). The three sets of contacts associated with the multiplicand keys are MC—1, these being the multiplicand list controlling contacts (see Fig. 34d) and the other contacts associated with the multiplicand keys are MCLH and MCRH and such contacts are shown on Fig. 34b. The multiplier keys in the C section have two sets of contacts, one set being the multiplier list contacts designated MP—1 (Fig. 34d) and the other contacts designated MP—X and shown on Fig. 34a. With regard to the MCLH and MCRH contacts it will be understood that LH designates that the contacts are for controlling LH components and RH designates that the contacts are for controlling RH components. It will be assumed that 3225 has been set up on the A keyboard, that 1326 has been set up on the B keyboard and that 9007 has been set up on the C keyboard.

Before the machine is started in operation current will be supplied to the machine by closing switch 250 (Fig. 34a) supplying current from the source to the driving motor M. The AC-DC generator designated 251 is also set in operation. With this AC-DC generator in operation, direct current is supplied to the bus 252 (Fig. 34a) and alternating current impulses in proper time with the cyclic operation of the machine are impressed on the bus 253. The operator of the machine after having set up the amounts on the A, B and C keyboards depresses the motor bar 17 (Fig. 34a). The setting up of the multiplier amount of 9007 on the B keyboard will have opened the latch bar zero contacts 142u and 142th and have left zero contacts 142t and 142h closed. It will be understood that the suffix u, t, h and th refers to the columnar orders of the multiplier, viz. units, tens, hundreds and thousands respectively.

Heretofore and hereinafter in the specification, the term "relay" will be used to designate both a relay magnet coil and the contact or contacts controlled thereby. The terms "relay magnet" or "relay coil" and "contacts" or "relay contacts" will be used to refer to the corresponding part or parts of the relay. The term "relay" will also be used to broadly refer to the electromagnetically tripped mechanically controlled and restored multi-contact relays which are used for multiplication control and column shift entry purposes and to the other relays which may be of the purely electrical type such as the relays with parts 262, 262a, 262b, etc., (Fig. 34a) or to the electromagnetically tripped and mechanically restored relays such as those comprising relay magnet 122 and contacts RHO—1 to 8 (Fig. 17). When the multiplier and column shift entry switching relays are referred to broadly, in certain cases, the magnet or relay coil of these relays will be referred to as a "control magnet". When emphasis is to be placed on the tripping function of such magnet, such magnet will be referred to as a tripping control magnet. When the term "control magnet" is to be used it will be understood that the term is used in its broader sense covering not only a tripping magnet per se, but also a magnet of any type adapted to effect control, or bring about contact operation in any manner whatsoever through the energization of the magnet. The relays which include relay coils 262, 261, 260 and 259 (Fig. 34a) will be termed "cycle controlling relays" or "control relays" and their contacts 264 will be termed "stick contacts" and their other contacts 262a, 262b, 261a, 261b, etc. will be termed "column transfer contacts".

The cycle controller section of the machine will now be described. Such cycle controller is controlled by the zero contacts of the 142u to 142th group just referred to.

Referring to Fig. 34a, 259, 260, 261 and 262 are cycle controller relay magnet coils. These coils are all connected by a common return line 263 to ground and each of these coils has stick circuit contacts 264 which receive current at the proper time through a supply circuit 265, which circuit is established to the DC main upon the closure of cam contacts PPB. The other side of the coils 259 to 262, etc. extend through individual circuits 266, 267, 268, 269 to one set of segment spots of a sequential switching mechanism which will be generally designated 237 on the circuit diagram. This sequential switching mechanism is the double brush emitter 237 shown in Fig. 1 and in the diagrammatic view Fig. 28. The zero bar contacts 142th, 142h, 142t and 142u are respectively connected to circuits 266 to 269 inclusive, and the other side of these contacts connect to a circuit designated 271, which extends through the motor bar contacts 270 (Figs. 16 and 16a) and back via path 272, cam contacts PPB to the bus 252. The circuit 271 beyond contact 142u extends to the center leaf of column transfer relay contacts 262a, 262b. There are a number of these transfer contacts which will be similarly numbered to correspond with their magnet coils 259 to 262 inclusive. The center leaf of the contact assemblages 262b, 262a also has a branch circuit designated 273, which leads to the segment spot of the segmental switching mechanism which is in alignment with and opposite to the segment spot to which line 269 connects. The other branches for the other segment spots are respectively labeled 274, 275 and 276. Disposed in circuit with the contacts 262a and 259a inclusive, when these contacts are closed, are the CS control magnets designated CSu, CSt, CSh and CSth respectively, designating units, tens, hundreds and thousands. From these CS control magnets for the column shift relays, denominational circuits generally designated 277 extend back to the common columnar buses designated 175 to 178 which are cooperatively related with the MPX contacts. The transverse buses of the MPX contact devices are designated MM 1 to 9. Such buses respectively lead through the X 1 to 9 multiplier relay magnets. The X relay magnets have their opposite sides connected to a common circuit 280, which in turn leads back through a circuit 281 and cam contacts 236 to ground. To the left beyond contacts 259b there is a circuit 283, which leads through cam contacts RHT, through cam contacts PPC—2 and through an RH trip magnet 122 and back to ground.

It has been previously explained that the zero bar contacts 142u and 142th are open and that contacts 142t and 142h are closed. This is the case since the amount of the multiplier is 9007 and accordingly significant numbers are only in the units and thousands place in the multiplier. Accordingly, upon actuation of the motor bar 77 and closure of the motor bar contacts 270, cycle controller relay coils 260 and 261 will become energized, and cycle controller relay coils 259 and 262 will remain de-energized. Accordingly, contacts 262a will remain closed and 262b will remain open. Current will accordingly flow through the motor bar contacts 270 via circuit 271, through contacts 262a, through the CSu magnet, through one of the wires 277 to the units order bus 175 and back through the MPX contact (in this case the 7th contact) to the X—7 relay magnet, causing energization of this relay magnet upon the closure of cam contacts 236.

In the present machine, provision is made for the elimination of unnecessary computing cycles when zeros appear in the multiplier. For example, according to the illustrative computation of the present case, the multiplier is 9007. The machine accordingly multiplies by 7 and by 9 and eliminates all cycles where zeros appear in the multiplier. The same elimination would also occur if instead of there being intermediate zeros, zeros appeared at other positions in the multiplier. For example, if the multiplier were 9070 the machine would still multiply by 7 and by 9 but would dispense with the computing cycle for the units order of the multiplier where zero appears and for hundreds order of the multiplier where zero likewise appears.

The controlling operations for cycle control and skipping of the intermediate zeros will be described before describing an actual multiplying operation.

It will be understood that the energization of the X—7 relay magnet and the energization of the CS units order relay magnet CSu will have prepared the machine for a multiplication of the multiplicand amount of 1326 by 7 and that during the actual multiplying operation the successively actuating switching mechanism or emitter 237 will be in operation so as to successively connect 266—276, 267—275, 268—274 and 269—273. The sequential switching mechanism travels in the direction indicated by the arrow (Fig. 34a) and makes a complete traverse of the spots marked 4, 3, 2, and 1, once per countercycle, traversing first the highest order spots and successively thereafter the spots of the lower orders. One complete traverse of the sequential switching mechanism is made for each computing cycle or multiplying operation and upon a computation with two significant figures in the multiplier, such as 9007, there would be two traversing cycles of the sequential switching mechanism 237. With four significant figures in the multiplier, i. e. a multiplier of 9137, there would be four traversing cycles of the sequential switching mechanism. Cam contacts 236 are timed to close and to again reopen before the sequential switching device 237 contacts with any of the spots marked "4" to "1" inclusive. The motor bar contacts can and do become closed prior to the closing of cam contacts 236 and after the sequential switching mechanism 237 has passed the spots designated "1". The first closure of cam contacts 236 will bring about an energization of CSu and an X relay magnet. During the time that the multiplication is being effected by the amount in the units order the sequential switching mechanism will first wipe the "4" spots without effect since no current supply is available on 266, 142th being open. On wiping the "3" spots there would tend to be a circuit to the CSt magnet from 142h now closed, 267, 275, 260b (in shifted position), wire 283, contacts 259a (in the position shown) to CSth and to an X magnet. However, at the time 237 wipes the "3" spot, cam contacts 236 are open and the circuit is accordingly not completed. Likewise no current flow is established when the "2" spot is encountered for the same reason. However, upon the connection of 269 and 273 by the switching device 237 current will flow through the motor bar contacts 270, through 271, 273, 269 and through cycle controller relay coil 262 energizing this coil. This coil will remain energized because of its stick circuit and accordingly, transfer contacts 262a and 262b will be thrown to reverse position, that is 262a will be opened and 262b will be closed. Current will accordingly flow when cam contacts 236 again close from path 271, through contacts 262b and over through contacts 261b which are now closed and over through contacts 260b which are also closed, through closed contacts 259a, energizing the CSth magnet so that current will flow over to the thousands bus 178 of the MPX contact device to the number 9 contact and out through the X—9 magnet and back to ground through the path previously traced. The energization of X—9 will bring about multiplication by 9 in the thousands place. It may be explained that during each multiplying cycle the machine is preparing itself for the next multiplication by the next higher order of the multiplier which contains a significant figure.

It has been previously explained (see Figs. 16 and 16a) that provision is made in the machine for preventing depression of the motor bar 77 at improper cyclic times in the operation of the machine and for permitting depression of the motor bar at a proper cyclic time so that the cycle controlling operations are not interfered with by any improperly timed manual operation of the motor bar.

The multiplying operation will now be traced for the multiplication by 7, which is the units order value of the multiplier. In the manner previously explained, the X—7 magnet will be energized and the multiplier relay points generally designated X—7 on Fig. 34b will have been closed and the units order CSu magnet will have become energized closing the set of unit contact points designated 285L and 285R on Fig. 34c. At the proper time in the operation of the machine, the multiplying emitter 238 will emit impulses to the lines or buses designated 225 and the closed X—7 relay points permit differentially timed impulses to be impressed on the RH component lines 288 (Fig. 34b) and the LH component lines designated 289. The MCLH and MCRH contacts associated with the multiplicand keyboard will permit only certain selected differentially timed impulses to flow through to the buses 163 to 166 inclusive and to the buses 167 to 170 inclusive and to the lines designated 290 and 291, (see Figs. 34b and 34c) which lines lead to the column shift relay switching devices. The column shift relay switching device will at the first cycle direct the entries of the impulses into the proper columnar orders of the RH accumulator, the countermagnets of which are designated 121 on Fig. 34c. The LH impulses will flow through the lines 293 (Fig. 34c) and through the RHO 1 to 8 contacts and back through lines 294 to the countermagnets 121a of the LH accumulator. The impulses which thus flow will enter the proper partial product amounts into the proper orders of the LH and RH accumulators. With the typical computation under consideration (see Fig. 32) 214 will be entered into the LH accumulator and 7142 will be entered into the RH accumulator. Upon the next multiplying cycle the column shift switching relays will direct the entry of the next partial product component into the proper columnar orders of the LH and RH accumulators. As shown in Fig. 32 the next entry is an entry of 215 into the LH accumulator and an entry of 9784 into the RH accumulator. After all of the LH and RH components of products are entered into the accumulators, magnet 122 will become energized and the energization of this magnet will release contacts RHO 1 to 8 inclusive and allow the same to be shifted to reverse position.

The machine is now ready to transfer over amounts from the RH accumulator into the LH accumulator. Concurrently with the shifting of contacts RHO 1 to 8 inclusive, contact RHO 9 will have also become closed. The closure of this contact will permit current to flow from bus 253 to wire 296 to the transfer of products emitter 239. This emitter 239 upon coming into operation sends impulses through the RHRO readout device designated RHRO on the diagram, Fig. 34c. The impulses flow out from this RHRO readout device over to the transfer lines generally designated 294 and to the LH countermagnets 121a. Accordingly, the amount which previously stood upon the RH accumulator is transferred over and entered into the LH accumulator in proper columnar relation therein. This entry is indicated diagrammatically in Fig. 32.

The machine has now completed its multiplying calculating operation and is ready to print and punch the amount of the product. The printing and punching is brought about in the manner now to be explained. After the 239 emitter traverses the last or units position, the emitter brush of this emitter intercepts an emitter spot 298 and establishes a circuit to ground through the printing and punching clutch magnet 299 (see Figs. 1a, 18 and 34c). The energization of this magnet calls into action the printing and punching section of the machine in the manner previously explained and the energization of this magnet also closes contacts designated PPC—1 and opens contacts PPC—2 (see Figs. 34c and 34a). Immediately after the energization of the 299 magnet the contacts RHO 1 to 8 inclusive and contacts RHO 9 are restored to normal position. This is effected by the cam mechanism previously described.

Referring to Fig. 34a, the opening of contacts PPC—2 will prevent any further energization of magnet 122 until the next complete multiplication cycle has been performed upon a new multiplying computation derived from a separate and further keyboard set up. Provision is made for maintaining the punch and printing clutch magnet 299 energized for the desired cyclic time in the operation of the machine. This control is afforded by cam contacts PPA (Fig. 34c) which close a stick circuit through 299, through contacts PPC—1. As has been explained the machine has the product of the computation set up on the LH accumulator and it is ready to print and punch this result. Concurrently, with the printing and punching of the product the machine prints and punches the account number, the amount of the multiplicand and the amount of the multiplier. All of these printing and punching operations including the listing and punching of the account number, the listing and punching of the multiplicand amount, the listing and punching of the multiplier amount and the printing and punching of the product amount are effected by a common emitter. This emitter is designated 240 on the circuit diagram (see Fig. 34d) and this emitter is driven from the printer and punch driving shaft of the machine. At the proper time in the cycle of operation of this shaft, and upon closure of contacts 241, the emitter 240 emits differentially timed impulses to the set of buses generally designated L—1 to 9. Buses L—1 to 9 as previously explained, extend through the AC—1 contacts, the MC—1 contacts and the MP 1 contacts. Buses L—1 to 9 are also electrically connected by wires 302 to the LHRO readout devices associated with the LH accumulator (see Figs. 34d and 34c). Suitable circuit connections generally designated 303, 304 and 305 (see Fig. 34d) extend from the columnar buses of the AC—1 contact devices, the MC—1 contact devices and the MP—1 contact devices to the plug board generally designated 306. From the brushes of the LHRO readout devices connections 307 also extend to this plug board 306. On the plug board there are other suitable plug sockets which are generally designated 308 and 309. The 308 sockets are wired to the printing magnets 310 (see Fig. 20) of the printing mechanism and the sockets 309 are wired to the punch selector magnets 118 (see Fig. 22). By proper plug connections as indicated by dotted lines at 312 and 313 (Fig. 34d) the entries can be placed in the desired selected columnar orders of the printing and punching mechanism.

It will be understood that the emitter 240 emits the impulses through the LHRO readout devices, through the AC—1 contacts, the MC—1 contacts and the MP—1 contacts to control the setting of the printing and punching mechanism so that upon subsequent hammer striking actions of the printing mechanism and upon punching operation of the punching die mechanism, the printing device will print the amount number, the multiplicand amount, the multiplier amount and the punching device will correspondingly punch these various amounts upon a record card.

In order to print and punch zeros appearing in the amount number, the multiplicand or the multiplier, the zero spot of the 240 emitter is wired up by a circuit 315 (Fig. 34d) which extends to one side of all of the contacts 142 previously referred to. The other side of each of these contacts 142 is individually connected to its associated bus bar in the AC bank, MC bank and the MP bank. It will accordingly, be understood that if a key is not depressed in any bank its corresponding contact 142 will remain closed and this will permit the zero impulse to flow through the circuit 315 and over through the closed contact 142 to the proper columnar order of the printing and punching mechanisms. For controlling the printing and punching of zeros in the product, the LHRO readout device is shown as provided with zero spots which are similarly wired up to the zero spot of emitter 240.

Following the printing and punching of this data, the paper feed in the printing mechanism will operate in the usual way and a new card will be entered into the punching die of the punching mechanism so that upon the next operation the data of the new computation will be printed and punched. The reset of the LH and RH accumulators is brought about as an incident to and at the latter part of the printing and punching cycle by the mechanism previously explained. A new computation can now be set up on the keyboard and the operation repeated for this new computation.

What we claim is:

1. A multiplying machine with a plurality of multiplication controlling multi-contact relays, a plurality of multi-contact column shifting relays, each of said relays having a control magnet, and a series circuit extending through the control magnet of a multiplication controlling relay and the control magnet of a column shifting relay.

2. A cycle control for a multiplying machine for skipping columns in which zero appears in the multiplier, comprising a circuit establishing device to close a circuit when a zero appears in a column of the multiplier, a relay coil under control of said device, said relay having both stick circuit establishing contacts and column shift control contacts.

3. A column shifting and zero column skipping device for a multiplying machine comprising a column control which includes a column shift relay magnet, column shifting contacts for selectively diverting current to said relay magnet or to a higher order relay magnet, a relay for controlling the shifting of said last mentioned contacts, said relay having associated with it its own stick contacts for maintaining the relation of the shifting contacts upon an initial energization of the said relay.

4. A multiplying machine having a plurality of multi-contact multiplication controlling relays, a plurality of multi-contact column shifting relays, each of said relays having a control magnet, and a multiplier set-up contact device connected with said relays for selectively connecting the control magnet of a multiplication controlling relay with the control magnet of a column shifting relay.

5. A multiplying machine having a plurality of multi-contact multiplication controlling relays, a plurality of multi-contact column shifting relays, each of said relays having a control magnet, multiplier-entry-controlled contact devices in circuit with said relay control magnets for selectively connecting the control magnet of a multiplication controlling relay with a pre-selected control magnet of a column shifting relay, and electrically operated transfer contacts with means for controlling their open or closed condition for pre-selecting which of the column shift control magnets is to be in circuit with the multiplier entry-controlled contact devices.

6. A multiplying machine having a plurality of multiplication relay magnets, a plurality of column shift relay magnets, column shifting contacts for selectively diverting current to a predetermined column shift relay magnet or to a higher order column shift relay magnet, and a multiplier entry-controlled contact device for establishing a series circuit through the selected column shift relay magnet and a multiplication relay magnet.

7. The combination of claim 6 which includes a plurality of relay magnets for controlling the shifting of the column-shifting contacts, each of said relay magnets being associated with its own stick contacts for maintaining the pre-selected relation of the column shifting contacts upon an initial energization of said relay magnet.

8. A column shifting device for a multiplying machine, comprising a plurality of column shift relay magnets, a plurality of corresponding sets of column shift control contacts respectively connected in circuit with said magnets for selectively diverting current to the associated magnet or to a magnet of a higher order, a plurality of corresponding controlling magnets for respectively shifting the sets of contacts, and a selective switching device for directing current to said controlling magnets selectively under the control of the column shift control contacts, said switching device including a plurality of sets of normally open contacts, each connected to the column shift control contacts of a relay magnet and to a source of current, and a common bridging member for successively traversing all of said sets of contacts.

9. A column shifting and zero skipping device for a multiplying machine, comprising column shift relay magnets, corresponding sets of column shift control contacts, connected in circuit therewith for selectively diverting current to the associated magnet or to a magnet of a high order, corresponding controlling magnets for shifting the said contacts, a selective switching device for directing current to said controlling magnets selectively under the control of the column shift control contacts, and zero skipping means including zero skipping contact devices in circuit with each of the column shift contact controlling magnets, for automatically diverting current to each of said controlling magnets which corresponds to a column of the multiplier amount in which a zero stands, and stick contacts associated with each of said contact controlling magnets and directly operated thereby for continuing energization of said magnets upon an initial energization by operation of the zero skipping contact devices or the selective switching device.

10. A multiplying machine having a contact device settable according to the entry of multiplier amounts into the machine, a set of associated keys for manually operating said contact device, a plurality of multi-contact multiplication controlling relays, a plurality of multi-contact column shifting relays, control magnets for said relays, and circuits for connecting the control magnet of a column shifting relay in series with the control magnet of a multiplication controlling relay, in accordance with the amount set up in the amount entering contact device.

11. A multiplying machine including a plurality of circuits through which impulses are ultimately to flow, said machine including a plurality of multi-contact multiplication control relays for selecting which impulses are to flow in said circuits, a plurality of multi-contact column shifting relays for selecting in which circuits the aforesaid impulses as selected by the multiplication control relays are to flow, a power driven shaft and means driven from said shaft for permitting closing and effecting opening movements of the multiplication control relay contacts, and means also driven from said shaft for permitting closing and effecting opening movement of the column shift relay contacts whereby coordinate control of impulse selection and directed flow over the circuits is positively provided.

12. A multiplying machine of electrical type including a plurality of circuits through which impulses are ultimately to flow, multiplication relays and column shift relays, both of said relays controlling and selecting impulse flow over said circuits, both of said relays having armatures and latching means therefor, electromagnetic tripping means for the latching means, means for supplying current concurrently to the electromagnetic tripping means of both relays and timed mechanically actuated means for relieving latching pressure upon the latching means of both of said relays prior to the electromagnetic tripping of the same and being effective to concurrently relieve said latching pressure on both sets of relays prior to the common supply of current to the electromagnetic tripping means thereof whereby both relays may be tripped concurrently by the common supply of current and whereby impulse control and selection over the impulse circuits is made more certain by the assurance that pressure on the latching means will not prevent the tripping of one relay when a cooperating relay becomes tripped.

JAMES W. BRYCE.
GEORGE F. DALY.